United States Patent
Yoshii

(10) Patent No.: US 7,710,139 B2
(45) Date of Patent: May 4, 2010

(54) ELECTRO-OPTICAL DEVICE AND ELECTRONIC APPARATUS

(75) Inventor: Masahito Yoshii, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/389,559

(22) Filed: Feb. 20, 2009

(65) Prior Publication Data

US 2009/0212808 A1    Aug. 27, 2009

(30) Foreign Application Priority Data

Feb. 21, 2008    (JP)    ............... 2008-040286

(51) Int. Cl.
*G01R 31/02*    (2006.01)

(52) U.S. Cl. ...................................... 324/763

(58) Field of Classification Search ................ 324/770, 324/765, 158.1, 763, 96, 500, 537; 438/14–18; 257/48, 350, 734, 786, 781
See application file for complete search history.

(56) References Cited

U.S. PATENT DOCUMENTS 7,245,143 B2 *    7/2007    Hasegawa et al. ........... 324/770
7,268,416 B2 *    9/2007    Furihata ..................... 257/678

FOREIGN PATENT DOCUMENTS

| JP | 07-013515 | 1/1995 |
| JP | 2001-197686 | 7/2001 |
| JP | 2007-079541 | 3/2007 |

\* cited by examiner

*Primary Examiner*—Ha Tran T Nguyen
*Assistant Examiner*—Tung X Nguyen
(74) *Attorney, Agent, or Firm*—Workman Nydegger

(57) ABSTRACT

An electro-optical device includes a test circuit for testing drive of a plurality of pixel units and a plurality of test terminals that output inputted signals to the test circuit or that output signals inputted from the test circuit. The test terminals including a first test terminal input with a high frequency signal with a frequency higher than a frequency of a signal output from a second terminal. A third test terminal is interposed between the first test terminal and the second test terminal.

5 Claims, 6 Drawing Sheets

ELECTRO-OPTICAL DEVICE AND ELECTRONIC APPARATUS

BACKGROUND

1. Technical Field

The present invention relates to an electro-optical device such as a liquid crystal device or the like. In addition, the invention further relates to an electronic apparatus that is provided with an electro-optical device. An example of a variety of electronic apparatuses to which the invention can be applied includes but not limited to a liquid crystal projector.

2. Related Art

A typical electro-optical device of related art has the following configuration. A plurality of pixel units (i.e., pixels) is formed over a substrate. A variety of peripheral circuits such as a driving circuit and a test circuit, though not limited thereto, are provided around the pixels. The driving circuit provides a driving force to the plurality of pixels for the operation thereof. The test circuit is used for testing the electro-optical device. In addition, a plurality of input terminals through which various kinds of input signals are inputted into the driving circuit and other circuits/components/elements and the like and a plurality of output terminals through which various kinds of output signals are outputted from the driving circuit and other circuits/components/elements and the like are provided over the substrate. An example of such a configuration of the related art is described in JP-A-2007-79541. The plurality of these terminals include test terminals through which test input signals are inputted into the test circuit and test output signals are outputted from the test circuit and the driving circuit at the time when an inspection is conducted on such an electro-optical device. The testing of the electro-optical device is performed on the basis of the test output signals that are outputted through the test terminals.

These days, there is a growing demand for an electro-optical device that features a small size. As the market demands for a smaller electro-optical device, it is required that the array pitch of a plurality of terminals thereof, inclusive of that of test terminals, should be decreased. As the terminal-to-terminal array pitch narrows, there is an increased risk that probe pins, each of which is used for inputting a signal through a test terminal at the time of testing operation or used for outputting a signal through a test terminal at the time of testing operation, cause a test failure that is attributable to such a narrow array pitch. That is, because of the narrow pitch, the distance between two test terminals that are provided adjacent to each other could be too small for accurate testing or even too small to cause a pin contact therebetween. If any other test terminal through which an input signal having a relatively high frequency is inputted or through which an output signal having a relatively high frequency is outputted is provided next to a certain test terminal through which a test signal is outputted under such a narrow pitch layout, the close pin array or pin contact explained above could cause a high-frequency noise contamination. That is, the waveform of the high-frequency signal may be contained as a noise in the detected output signal, which makes it practically impossible or at best difficult to conduct a substantially error-free inspection in an accurate manner.

SUMMARY

An advantage of some aspects of the invention is to provide an electro-optical device that makes it possible to conduct a substantially error-free inspection in an accurate manner while achieving a smaller size in an easy manner. In addition, the invention further provides, as an aspect thereof, an electronic apparatus that is provided with such an electro-optical device.

In order to address the above-identified problem without any limitation thereto, the invention provides, as a first aspect thereof, an electro-optical device that includes: a substrate; a plurality of pixel units that is arrayed over the substrate; a driving circuit that drives the plurality of pixel units; a test circuit that is provided over the substrate so as to test the driving of the plurality of pixel units, which is driven by the driving circuit; and a plurality of test terminals that is provided over the substrate so that, at the time of testing, input signals should be inputted to the test circuit at test terminals and output signals should be outputted from the test circuit and the driving circuit at test terminals, the input signals and the output signals being correctively referred to as input/output signals hereafter, wherein the plurality of test terminals is arrayed in such a manner that a part of the plurality of test terminals is not adjacent to any of other test terminals thereof through each of which an input signal having a predetermined frequency is inputted or an output signal having a predetermined frequency is outputted as a part of the input/output signals or not adjacent to other test terminal thereof through which an input signal having a predetermined frequency is inputted or an output signal having a predetermined frequency is outputted as a part of the input/output signals; and the part of the plurality of test terminals is made up of terminals through each of which a test output signal is outputted for the testing as a part of the input/output signals.

In the configuration of an electro-optical device according to the first aspect of the invention described above, a driving circuit drives a plurality of pixel units at the time of the operation thereof. By this means, the image-display operation of an electro-optical device according to the first aspect of the invention described above is performed in an active matrix drive scheme as a typical example thereof without any limitation thereto.

An electro-optical device according to the first aspect of the invention described above is provided with a test circuit that conducts an inspection on the driving of the pixels, which are driven by the driving circuit. Various kinds of input signals are inputted for the purpose of testing to some of the plurality of test terminals. In addition, various kinds of output signals are outputted for the purpose of testing from other test terminals. For example, signals each of which is used for driving the test circuit are inputted each as an input signal to some of the plurality of test terminals. Examples of the input signals include but not limited to a clock signal and a start signal, which are described below. In addition, output signals that are generated as a result of testing are outputted through other test terminals from the test circuit and the driving circuit. The inspection on the driving of the pixel units by the driving circuit is conducted on the basis of these test output signals that are outputted from the test circuit and the driving circuit through these test terminals. The test circuit is provided over a substrate that is the same substrate over which the plurality of pixel units is formed. The same holds true for the plurality of test terminals. In addition, at least a part of the driving circuit is provided over a substrate that is the same substrate over which the plurality of pixel units is formed.

The plurality of test terminals is arrayed along at least one side (e.g., edge) of the substrate. In the configuration of an electro-optical device according to the first aspect of the invention described above, the plurality of test terminals is arrayed in such a manner that a part of the plurality of test terminals is not adjacent to any of other test terminals thereof through each of which an input signal having a predetermined frequency is inputted or an output signal having a predetermined frequency is outputted as a part of input/output signals or not adjacent to other test terminal thereof through which an input signal having a predetermined frequency is inputted or an output signal having a predetermined frequency is outputted as a part of the input/output signals, and the part of the plurality of test terminals is made up of terminals through each of which a test output signal is outputted for the testing as a part of the input/output signals. Herein, the term "an input signal having a predetermined frequency and an output signal having a predetermined frequency" means a binary input signal that is inputted to the test terminal and a binary output signal that is outputted from the test terminal whose electric potential switches over between two levels in a periodic manner. That is, it fluctuates periodically between a high electric potential level and a low electric potential level, which is lower than the high electric potential level. The high electric potential level may be referred to as high voltage level or H level. The low electric potential level may be referred to as low voltage level or L level.

Specifically, in the configuration of an electro-optical device according to the first aspect of the invention described above, the plurality of test terminals is arrayed in such a manner that a part of the plurality of test terminals, which is made up of terminals through each of which a test output signal is outputted, is not adjacent to any of other test terminals thereof through each of which an input signal having a predetermined frequency is inputted. Herein, it is assumed that there is more than one other test terminal through each of which an input signal having a predetermined frequency is inputted as explained in non-limiting exemplary embodiments of the invention. Therefore, it is possible to array each of the terminals that make up the part of the plurality of test terminals with at least a certain distance from the any of other test terminals thereof through each of which an input signal having a predetermined frequency is inputted.

A non-limiting example of "an input signal that has a predetermined frequency" is a clock signal that is used for driving the test circuit. The clock signal has a high frequency. If any of the part of the plurality of test terminals is provided next to a clock signal input test terminal to which the clock signal input is supplied, which is a non-limiting example of the other test terminal, a detected test output signal tends to be more susceptible to noise than otherwise. Specifically, such a layout has a greater risk of noise contamination in which the waveform of the high frequency clock signal appears as a noise component in a test output signal that is detected by means of a test probe at the high-frequency-adjacent test terminal, that is, the any of the part of the plurality of test terminals provided next to the other test terminal. Such noise contamination occurs as a result of, for example, electric or electro-magnetic interference or the like between terminals or test probes.

In contrast, in the configuration of an electro-optical device according to the first aspect of the invention described above, the part of the plurality of test terminals are arrayed at positions distanced from the other test terminal. By this means, it is possible to prevent any test probe that is used for detecting a test output signal that is outputted from one of the part of the plurality of test terminals from being provided close to, or in contact with, the test probe that is used for inputting the input signal that has a predetermined frequency into the other test terminal. Thus, if the test-terminal layout of an electro-optical device according to the first aspect of the invention described above is adopted, it is possible to prevent the waveform of the input signal having a predetermined frequency, which is inputted into the other test terminal, from being contained as a noise in any of test output signals detected at the part of the plurality of test terminals.

Likewise, in the configuration of an electro-optical device according to the first aspect of the invention described above, the plurality of test terminals is arrayed in such a manner that a part of the plurality of test terminals, which is made up of terminals through each of which a test output signal is outputted, is not adjacent to any of other test terminals thereof through each of which an output signal having a predetermined frequency is outputted or not adjacent to other test terminal thereof through which an output signal having a predetermined frequency is outputted. With such a configuration, since the part of the plurality of test terminals are arrayed at positions distanced from the other test terminals or the other test terminal, it is possible to prevent any test probe that is used for detecting a test output signal that is outputted from one of the part of the plurality of test terminals from being provided close to, or in contact with, the test probe that is used for detecting a test output signal having a predetermined frequency, which is outputted from the other test terminal. Thus, if the test-terminal layout of an electro-optical device according to the first aspect of the invention described above is adopted, it is possible to prevent the waveform of the output signal having a predetermined frequency, which is outputted from the other test terminal, from being contained as a noise in any of test output signals detected at the part of the plurality of test terminals.

As explained above, an electro-optical device according to the first aspect of the invention described above makes it possible to conduct a substantially error-free inspection on the basis of noise-free test output signals, which are outputted from the part of the plurality of test terminals, even when the array pitch of the plurality of the test terminals is small, that is, even with a narrow terminal-to-terminal pitch, which is required for making the size of the electro-optical device smaller.

In the configuration of an electro-optical device according to the first aspect of the invention described above, it is preferable that the plurality of test terminals should be arrayed in such a manner that each of the part of the plurality of test terminals is not adjacent to the other test terminal thereof through which a clock signal is inputted as one of the input/output signals.

In such a preferred configuration, the clock signal determines the driving frequency of the test circuit and the driving circuit at the time of testing operation. The clock signal is inputted into the other test terminal as a signal having a relatively high frequency.

In the preferred configuration of an electro-optical device according to the first aspect of the invention described above, the part of the plurality of test terminals through each of which a test output signal is outputted for the testing are arrayed at positions distanced from the other test terminal through which a clock signal is inputted. By this means, it is possible to prevent any test probe that is used for detecting a test output signal that is outputted from one of the part of the plurality of test terminals from being provided close to, or in contact with, the test probe that is used for inputting the clock signal into the other test terminal. Thus, if the preferred test-terminal layout of an electro-optical device according to the first aspect of the invention described above is adopted, it is possible to prevent the waveform of the clock signal having a relatively high frequency, which is inputted into the other test terminal, from being contained as a noise in any of test output signals detected at the part of the plurality of test terminals.

In the preferred configuration of an electro-optical device described above according to which the clock signal is inputted into the other test terminal as a signal having a relatively high frequency, it is further preferable that the test circuit should sequentially transfer a start signal, which is inputted as another one of the input/output signals, on the basis of the clock signal; and the plurality of test terminals should be arrayed in such a manner that each of the part of the plurality of test terminals is not adjacent to the other test terminal thereof through which the start signal is inputted.

In the preferred configuration of an electro-optical device described above, the clock signal and the start signal are inputted to the other test terminals as signals used for driving the test circuit. The start signal is a signal whose electric potential changes periodically from the L level to the H level. For example, as will be explained in detail later, the voltage level of the start signal changes for each one horizontal time period from the L level to the H level. The start signal is inputted as a signal having a frequency that is lower than that of the clock signal.

In the preferred configuration of an electro-optical device described above, the part of the plurality of test terminals through each of which a test output signal is outputted for the testing are arrayed at positions distanced from not only the other test terminal through which the clock signal is inputted but also the other test terminal through which the start signal is inputted. By this means, it is possible to prevent any test probe that is used for detecting a test output signal that is outputted from one of the part of the plurality of test terminals from being provided close to, or in contact with, the test probe that is used for inputting the clock signal into the other test terminal and the test probe that is used for inputting the start signal into the other test terminal. Thus, if the preferred test-terminal layout of an electro-optical device described above is adopted, it is possible to prevent the waveform of the start signal, which is inputted into the other test terminal, from being contained as a noise in any of test output signals detected at the part of the plurality of test terminals in addition to the above-explained advantageous effect of preventing the waveform of the clock signal, which is inputted into the other test terminal, from being contained as a noise in any of test output signals detected at the part of the plurality of test terminals. Note that it is assumed herein that the other test terminal to which the start signal input is supplied is a terminal that is different from the other test terminal to which the clock signal input is supplied.

In the configuration of an electro-optical device according to the first aspect of the invention described above, it is preferable that the plurality of test terminals should be arrayed in such a manner that each of the part of the plurality of test terminals is distanced from any of the other test terminals thereof or the other test terminal thereof with at least one test terminal being interposed between the part of the plurality of test terminals and the other test terminals thereof or the other test terminal thereof; and one of the input/output signals having a predetermined electric potential should be supplied through the one test terminal interposed therebetween.

In the preferred configuration of an electro-optical device according to the first aspect of the invention described above, as a non-limiting example of the one of the input/output signals having a predetermined electric potential that is supplied through the one test terminal interposed between the part of the plurality of test terminals and the other test terminals thereof or the other test terminal thereof, a power potential that is used for driving the test circuit and the driving circuit is inputted to the one test terminal that is interposed therebetween at the time of testing operation. Since the plurality of test terminals is arrayed in such a manner that each of the part of the plurality of test terminals through each of which a test output signal is outputted for the testing is distanced from any of the other test terminals thereof through each of which an input signal having a predetermined frequency is inputted or the other test terminal thereof through which an input signal having a predetermined frequency is inputted with at least one test terminal being interposed between the part of the plurality of test terminals and the other test terminals thereof or the other test terminal thereof, where one of the input/output signals having a predetermined electric potential is supplied through the one test terminal interposed therebetween, it is possible to make the interposed one test terminal through which the one of the input/output signals having a predetermined electric potential is supplied function as a shield against electric or electro-magnetic interference that would otherwise occur therebetween.

Thus, if the preferred test-terminal layout of an electro-optical device according to the first aspect of the invention described above is adopted, it is possible to prevent the waveform of the signal having a predetermined frequency, which is inputted into, or outputted from, the other test terminal, from being contained as a noise in any of test output signals detected at the part of the plurality of test terminals with enhanced reliability.

It is preferable that the electro-optical device according to the first aspect of the invention should be manufactured from a large-size substrate that includes a plurality of the substrates by cutting the large-size substrate into a plurality of the substrates. In such an electro-optical device, it is preferable that the plurality of test terminals should be arrayed over each substrate in such a manner that each of a certain area side of the part of the plurality of test terminals formed on one of two arbitrary-selected substrates, which are formed adjacent to each other on the uncut large-size substrate, is not adjacent to any of the other test terminals thereof or the other test terminal thereof formed at the opposite area side of the other of the two arbitrary-selected substrates.

In the manufacturing of such a preferable electro-optical device, the plurality of pixel units, at least a part of the driving circuit, the test circuit, and the plurality of test terminals are formed over each of the plurality of substrates that make up the uncut large-size substrate. After the formation of these elements/circuits/components over the each of the plurality of substrates, an inspection (i.e., test) is conducted. After the test, the large-size substrate is cut into, that is, divided into, the plurality of substrates.

Thus, if the preferred test-terminal layout of an electro-optical device according to the first aspect of the invention described above is adopted, noise prevention is also achieved for a test conducted during a manufacturing process over the uncut large-size substrate, which is the same non-limiting advantageous effect as that produced for the test of an electro-optical device explained above. That is, it is possible to prevent the waveform of a signal having a predetermined frequency inputted into or outputted from any of the other test terminals thereof or the other test terminal thereof formed at the opposite area side of the other of the two arbitrary-selected substrates, which are formed adjacent to each other on the uncut large-size substrate, from being contained as a noise in any of the detected test output signals, each of which is outputted from, at the certain area side, the corresponding one of the part of the plurality of test terminals formed on the one of two arbitrary-selected substrates.

In order to address the above-identified problem without any limitation thereto, the invention provides, as a second aspect thereof, an electronic apparatus that is provided with an electro-optical device according to the first aspect of the invention, which has any of the configurations described above, including its preferred or modified configurations.

According to an electronic apparatus of this aspect of the invention, it is possible to embody various kinds of electronic devices that are capable of providing a high-quality image display and enhancing reliability while achieving a smaller size in an easy manner thanks to the substantially error-free testing of an electro-optical device, including but not limited to, a projection-type display device, a television, a mobile phone, an electronic personal organizer, a word processor, a viewfinder-type video tape recorder, a direct-monitor-view-type video tape recorder, a workstation, a videophone, a POS terminal, a touch-panel device, and so forth, because the electronic apparatus of this aspect of the invention is provided with the electro-optical device according to the above-described aspect of the invention. In addition, as another non-limiting application example thereof, an electronic apparatus of this aspect of the invention may be also embodied as an electrophoresis apparatus such as a sheet of electronic paper.

These and other features, operations, and advantages of the present invention will be fully understood by referring to the following detailed description of exemplary embodiments in conjunction with the accompanying drawings.

BRIEF DESCRIPTION OF THE DRAWINGS

The invention will be described with reference to the accompanying drawings, wherein like numbers reference like elements.

FIG. 6 illustrates, in a partial close-up plan view, a test terminal area shown as a dotted box A0 in FIG. 5.

DESCRIPTION OF EXEMPLARY EMBODIMENTS

With reference to the accompanying drawings, exemplary embodiments of the present invention are described below. In the following exemplary embodiments of the invention, a liquid crystal device that conforms to an active-matrix driving scheme is taken as an example of various kinds of electro-optical devices according to some aspects of the invention.

Figure 1:
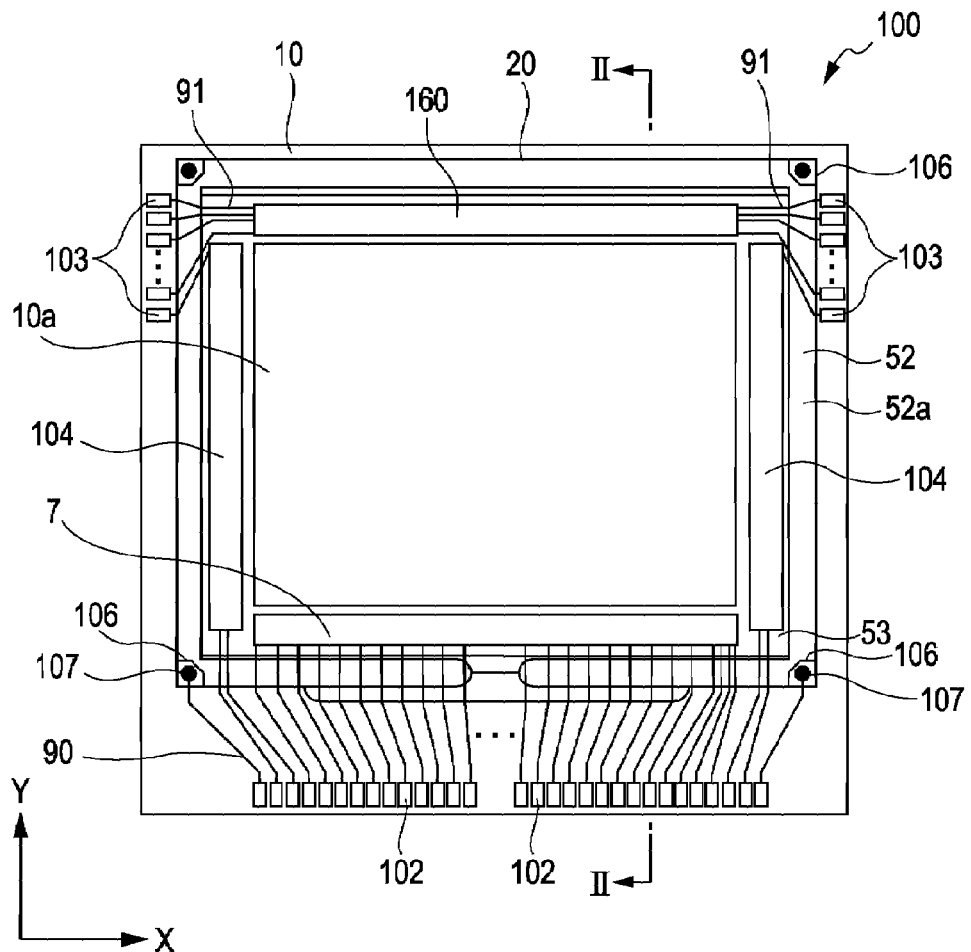
FIG. 1 is a plan view that schematically illustrates an example of the general configuration of a liquid crystal device according to an exemplary embodiment of the invention.
Figure 2:
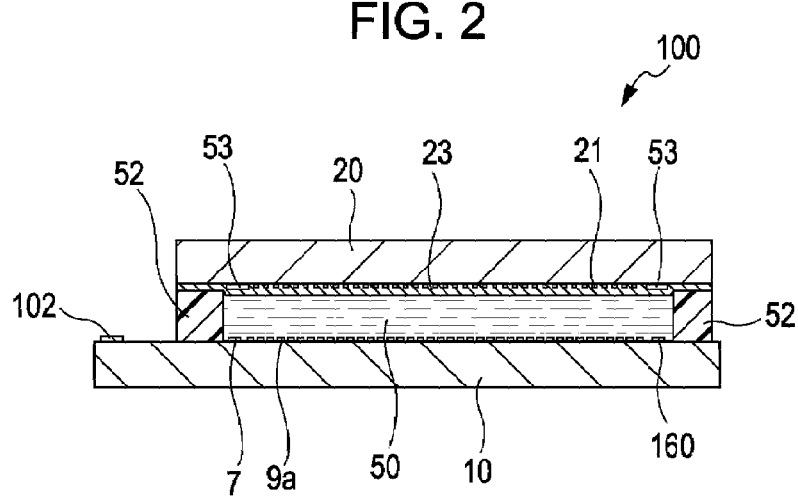
FIG. 2 is a sectional view taken along the line II-II of FIG. 1.

First of all, an example of the general configuration of a liquid crystal device according to the present embodiment of the invention is explained below while referring to FIGS. 1 and 2. FIG. 1 is a plan view that schematically illustrates an example of the configuration of a liquid crystal device viewed from above a counter substrate thereof, that is, from a certain point at the counter-substrate side. FIG. 2 is a sectional view taken along the line II-II of FIG. 1.

As shown in FIGS. 1 and 2, a liquid crystal device 100 according to the present embodiment of the invention is provided with an element substrate 10 and a counter substrate 20. The element substrate 10 and the counter substrate 20 are provided opposite to each other. The counter substrate 20 may be hereafter referred to as "opposite substrate". The element substrate 10 has a size larger than that of the counter substrate 20 when viewed in plan. Specifically, as illustrated in the plan view of FIG. 1, at least an area part of the element substrate 10 is exposed, that is, not covered by the counter substrate 20, as viewed from a certain point at the counter-substrate side when the element substrate 10 and the counter substrate 20 are provided so as to face each other. Or, in other words, at least an area portion of the element substrate 10 protrudes with respect to (i.e., as viewed from) the corresponding edge(s) of the counter substrate 20 when viewed in plan.

A liquid crystal layer 50 is sealed between the element substrate 10 and the counter substrate 20. The element substrate 10 and the counter substrate 20 are bonded to each other with the use of a sealing material 52 that is provided at a sealing region 52a around an image display region 10a. That is, the liquid crystal layer 50 is sealed between the element substrate 10 and the counter substrate 20 inside the image display area 10a that is surrounded by the sealing material 52.

The sealant material 52 is made from, for example, an ultraviolet (UV) curable resin, a thermosetting resin, or the like, which functions to paste these substrates together. In the production process of the liquid crystal device according to the present embodiment of the invention, the sealant material 52 is applied onto the element substrate 10 and subsequently hardened through ultraviolet irradiation treatment, heat treatment, or any other appropriate treatment. A gap material such as glass fibers, glass beads, or the like, are scattered in the sealant material 52 so as to set the distance (i.e., inter-substrate gap) between the element substrate 10 and the counter substrate 20 at a predetermined gap value.

Inside the sealing region 52a at which the sealant material 52 is provided and in parallel therewith, a picture frame light-shielding film 53, which has light-shielding property and defines the picture-frame region of the image display region 10a, is provided on the counter substrate 20 as illustrated in FIG. 1. Notwithstanding the above, however, a part or a whole of the picture frame light-shielding film 53 may be provided at the element-substrate (10) side as a built-in light-shielding film. The liquid crystal device 100 according to the present embodiment of the invention has a peripheral region, which is defined as an area that surrounds the image display region 10a. In other words, in the configuration of the liquid crystal device 100 according to the present embodiment of the invention, an area that is farther than the picture frame light-shielding film 53 when viewed from the center of the element substrate 10, that is, an area that is not inside but outside the picture frame light-shielding film 53, is defined as the peripheral region.

A plurality of external circuit connection terminals 102 is provided at a peripheral region outside the sealing region 52a at which the sealant material 52 is provided in such a manner that the external circuit connection terminals 102 are arrayed along one of four sides of the element substrate 10. Or, more specifically, the external circuit connection terminals 102 are arrayed along the exposed side of the protruding area part of the element substrate 10 that is not covered by the counter substrate 20 as viewed from a certain point at the counter-substrate (20) side. The external circuit connection terminals 102 include but not limited to image signal terminals each of which an image signal is supplied to. In the following description of this specification, the term "video signal terminal" may be used in place of image signal terminal. In like manner, in the following description of this specification, the term "video signal" may be used in place of image signal. In the configuration of the liquid crystal device 100 according to the present embodiment of the invention, the external circuit connection terminals 102 are aligned along the lower edge (i.e., lower side) of the element substrate 10 shown in the plan view of FIG. 1, which is the exposed side of the protruding area part of the element substrate 10 that is not covered by the counter substrate 20 as viewed from a certain point at the counter-substrate (20) side. The protruding area part of the element substrate 10 has a rectangular area shape that has a longer side extending in a horizontal direction as the exposed side thereof mentioned above.

A demultiplexer 7 is provided at a region that is elongated inside the sealing region 52a (not in the sealing region 52a) at which the sealant material 52 is provided. The demultiplexer 7 is provided in substantially parallel with the exposed side of the protruding area part of the element substrate 10 in such a manner that the picture frame light-shielding film 53 covers the demultiplexer 7. That is, the demultiplexer 7 is provided in substantially parallel with the one of four sides of the element substrate 10 along which the external circuit connection terminals 102 are arrayed. A pair of scanning line driving circuits 104 is provided inside the sealing region 52a along two of four sides thereof that are not in parallel with the one side in such a manner that each of the scanning line driving circuits 104 is covered by the picture frame light-shielding film 53. In addition to the above, a test circuit 160 is provided along the remaining one side of the element substrate 10, which is parallel with the first-mentioned one side thereof. The test circuit 160 is provided in a region inside the sealing region 52a. The picture frame light-shielding film 53 covers the test circuit 160. A plurality of test terminals 103 is electrically connected to the test circuit 160. In the following description of this specification as well as in the recitation of appended claims, the term "test terminal" has the meaning of a testing terminal or a terminal that is used for test purpose or used at the time of test operation, though not necessarily limited thereto. The plurality of test terminals 103 is provided along the second-mentioned two of four sides of the element substrate 10 along which the pair of scanning-line driving circuits 104 is provided. The plurality of test terminals 103 is arrayed outside a vertical part of the sealing region 52a that extends along each of these two of four sides of the element substrate 10. That is, in the configuration of the liquid crystal device 100 according to the present embodiment of the invention, the plurality of test terminals 103 is arrayed in edge regions that are elongated along the left side of the element substrate 10 and the right side thereof as shown in the plan view of FIG. 1.

Inter-substrate conductive terminals 106, which connect the element substrate 10 with the counter substrate 20 by means of inter-substrate conductive material 107, are provided on the element substrate 10 at positions corresponding to four corners of the counter substrate 20, respectively. With such a structure, it is possible to establish electric conduction between the element substrate 10 and the counter substrate 20. An electric wiring pattern 90, which is made up of a plurality of electric wires/lines, is formed over the element substrate 10. The electric wiring pattern 90 provides electric connection between some of the external circuit connection terminals 102 and the demultiplexer 7. In addition, the electric wiring pattern 90 provides electric connection between some of the external circuit connection terminals 102 and the scanning-line driving circuits 104. Moreover, the electric wiring pattern 90 provides electric connection between some of the external circuit connection terminals 102 and the inter-substrate conductive terminals 106. The electric connection provided by the electric wiring pattern 90 is not necessarily limited to those described above. In addition to the electric wiring pattern 90 explained above, another electric wiring pattern 91, which is made up of a plurality of electric wires/lines, is formed over the element substrate 10. The electric wiring pattern 91 provides electric connection between some of the test terminals 103 and the test circuit 160 as well as between some of the test terminals 103 and the scanning line driving circuits 104. The electric connection provided by the electric wiring pattern 91 is not necessarily limited to those described above.

Though not specifically illustrated in FIG. 2, a layered structure that includes laminations of TFTs for pixel switching, which are driver elements, and of wirings such scanning lines, data lines, and so on, is formed on the element substrate 10. In the image display region 10a, pixel electrodes 9a are provided at a layer over the wiring structure of the pixel-switching TFTs, the scanning lines, the data lines, and the like. An alignment film (i.e., orientation film) is deposited on the pixel electrodes 9a. On the other hand, a light-shielding film 23 is deposited on a surface of the counter substrate 20 that is opposite to the element substrate 10. A counter electrode 21, which is made of a transparent material such as indium tin oxide (ITO) or the like, is deposited on the light-shielding film 23. The counter electrode 21 is formed opposite to the plurality of pixel electrodes 9a. Another alignment film is deposited on the counter electrode 21. The liquid crystal layer 50 is made of liquid crystal that consists of, for example, a mixture of one or more types of nematic liquid crystal element. Such liquid crystal takes a predetermined orientation state between a pair of the above orientation films (i.e., alignment films).

A lamination of a polarizing film/plate and a phase difference retardation film, though not limited thereto, is provided, with a predetermined orientation, at each of the incoming-light side of the counter substrate 20 and the outgoing-light side of the element substrate 10 depending on a variety of operation modes such as a twisted nematic (TN) mode, a super twisted nematic (STN) mode, and a double super twisted nematic (D-STN) mode, or a normally white mode/normally black mode, though not limited thereto.

Figure 3:
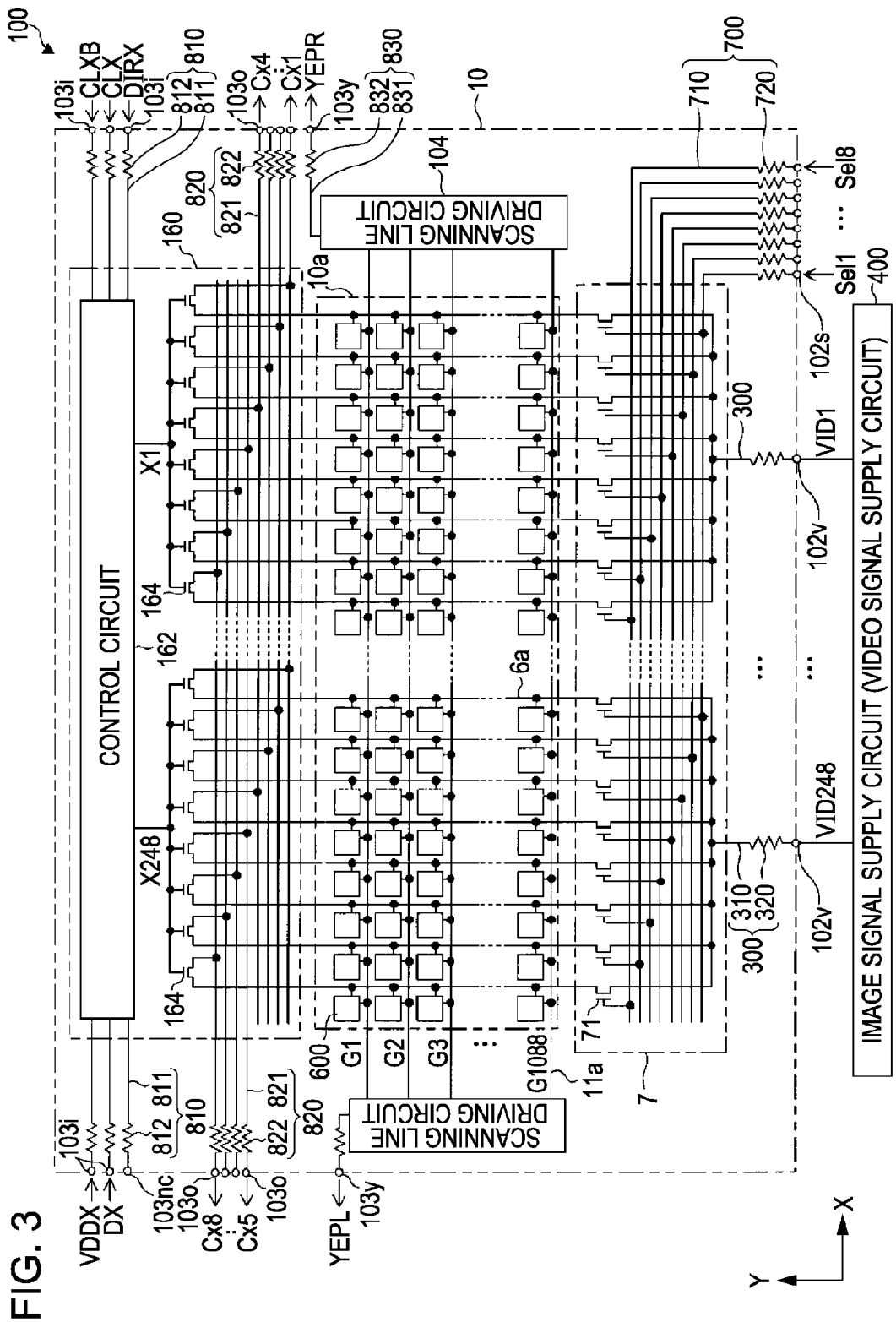
FIG. 3 is a block diagram that schematically illustrates an example of the electric configuration of a liquid crystal device according to an exemplary embodiment of the invention.
Figure 4:
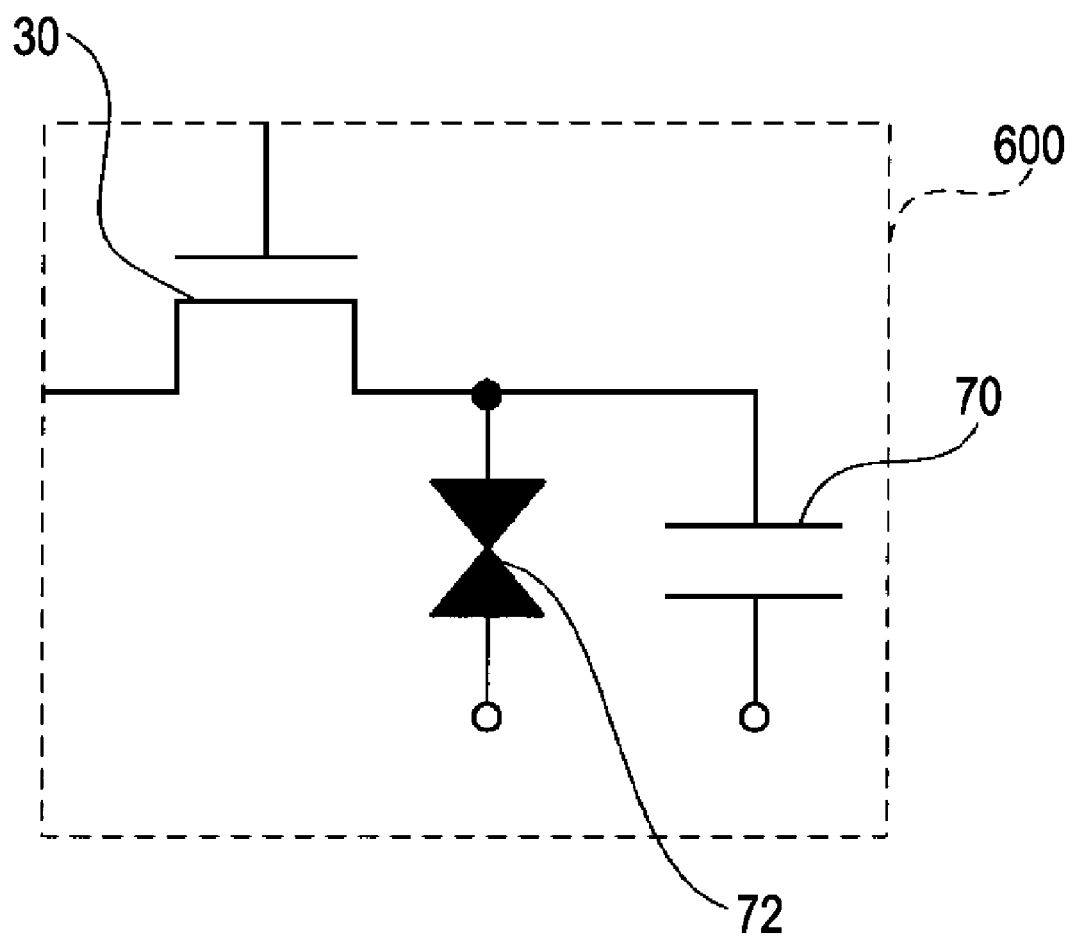
FIG. 4 is an equivalent circuit diagram that schematically illustrates, as an example thereof, the circuit configuration of one of a plurality of pixel units (e.g., pixels) of a liquid crystal device according to an exemplary embodiment of the invention.

Next, with reference to FIGS. 3 and 4, the specific configuration of a liquid crystal device according to the present embodiment of the invention is explained below. FIG. 3 is a block diagram that schematically illustrates an example of the electric configuration of a liquid crystal device according to an exemplary embodiment of the invention. FIG. 4 is an equivalent circuit diagram that schematically illustrates, as an example thereof, the circuit configuration of one of a plurality of pixel units (e.g., pixels) of a liquid crystal device according to an exemplary embodiment of the invention.

As illustrated in FIG. 3, the liquid crystal device 100 is provided with the demultiplexer 7, the scanning line driving circuit 104, and the test circuit 160. The scanning line driving circuits 104 explained above may be collectively referred to herein and hereafter in a singular form. The demultiplexer 7, the scanning line driving circuit 104, and the test circuit 160 are formed over the element substrate 10 thereof. Some of the external circuit connection terminals 102 are formed as video signal terminals (i.e., image signal terminals) 102v over the element substrate 10. A video signal supply circuit (i.e., image signal supply circuit) 400 is electrically connected to the plurality of video signal terminals 102v. The video-signal supply circuit 400 is provided as an external circuit that is separated from the element substrate 10. It should be noted that a "driving circuit" according to an aspect of the invention can be embodied as a combination of the demultiplexer 7, the scanning line driving circuit 104, and the video signal supply circuit 400 described in this specification as a non-limiting exemplary configuration thereof.

One thousand eighty-eight (1,088) rows of scanning lines 11a are formed in the image display area 10a over the element substrate 10. Each of 1,088 rows of the scanning lines 11a extends in the X direction. On the other hand, 1,984 columns of data lines 6a are formed in the image display area 10a over the element substrate 10. Each of 1,984 columns of the data lines 6a extends in the Y direction. These 1,984 columns of data lines 6a are divided into 248 groups each of which is made up of eight data lines 6a (248×8=1,984). These data lines 6a and the scanning lines 11a are electrically insulated from each other over the element substrate 10. Notwithstanding the above, however, the number of the scanning lines 11a is not limited to 1,088. The number of the data lines 6a is not limited to 1,984. Although it is explained that the number of the data lines 6a that make up each group is eight, the technical scope of the invention is not limited to such an exemplary configuration. That is, the number of the data lines 6a that make up each group may be modified into any integral number greater than one.

A plurality of pixel units 600 is arrayed at positions corresponding to the intersections of the above-explained 1,088 scanning lines 11a and the above-explained 1,984 data lines 6a. Therefore, in the configuration of the liquid crystal device 100 according to the present embodiment of the invention, the plurality of pixel units 600 is arrayed in a matrix pattern that has 1,088 rows and 1,984 columns with a predetermined inter-pixel pitch, that is, with a predetermined inter-pixel distance each therebetween.

As shown in FIG. 4, each of the plurality of pixel units 600 is provided with a pixel-switching TFT 30, a liquid crystal element 72, and a storage capacitor 70.

The source electrode of the pixel-switching TFT 30 is electrically connected to the data line 6a. The gate electrode of the pixel-switching TFT 30 is electrically connected to the scanning line 11a. The drain electrode of the pixel-switching TFT 30 is electrically connected to the pixel electrode 9a of the liquid crystal element 72, a more detailed explanation of which will be given later. The operation state of the pixel-switching TFT 30 is switched over between ON and OFF in accordance with a scanning signal that is supplied from the scanning line driving circuit 104.

The liquid crystal element 72 is made up of a pixel electrode 9a, a counter electrode 21, and liquid crystal. The liquid crystal is sandwiched between the pixel electrode 9a and the counter electrode 21. A data signal having a predetermined signal level is supplied through the data line 6a to the pixel electrode 9a of the liquid crystal element 72. After being written into the liquid crystal of the liquid crystal element 72 via the pixel electrode 9a thereof, the data signal having a predetermined signal level is held for a certain time period between the pixel electrode 9a of the liquid crystal element 72 and the counter electrode 21 thereof. Liquid crystal changes its orientation and/or its order of molecular association depending on the level of a voltage that is applied thereto. By this means, it modulates light to realize a gradation display. Under a "normally-white" mode, the optical transmittance (i.e., light transmission factor) with respect to an incident light beam decreases in accordance with a voltage applied on a pixel-by-pixel basis (i.e., to each pixel), whereas, under a "normally-black" mode, the optical transmittance with respect to an incident light beam increases in accordance with a voltage applied on a pixel-by-pixel basis. Thus, when viewed as a whole, light having a certain contrast in accordance with an image signal is emitted from the liquid crystal device 100.

In order to prevent the leakage of an image signal being held between the pixel electrode 9a and the counter electrode 21, the aforementioned storage capacitor 70 is added in electrically parallel with a liquid crystal capacitor that is formed between the pixel electrode 9a and the counter electrode 21.

The liquid crystal device 100 according to the present embodiment of the invention has the plurality of pixel units 600 each of which has a circuit configuration explained above. The plurality of pixel units 600 is arrayed in a matrix pattern in the image display area 10a thereof. Therefore, the liquid crystal device 100 according to the present embodiment of the invention can be operated in an active-matrix driving scheme.

Referring back to FIG. 3, an example of the electric configuration of the liquid crystal device 100 is further explained. In the following description of an exemplary embodiment of the invention, eight data lines 6a that belong to the same single group may be called as "a-column" data line 6a, "b-column" data line 6a, "c-column" data line 6a, "d-column" data line 6a, "e-column" data line 6a, "f-column" data line 6a, "g-column" data line 6a, and "h-column" data line 6a for the purpose of distinguishing them from one another. The same series of reference alphabets "a, b, c, d, e, f, g, and h" is assigned to each of all 248 groups of the data lines 6a. The reference alphabet "a" is assigned to the rightmost one of eight data lines 6a of each group. The reference alphabet "b" is assigned to the second one from the right. The reference alphabet "c" is assigned to the third one from the right. The reference alphabet "d" is assigned to the fourth one from the right. The reference alphabet "e" is assigned to the fifth one from the right. The reference alphabet "f" is assigned to the sixth one from the right. The reference alphabet "g" is assigned to the seventh one from the right. Finally, the reference alphabet "h" is assigned to the leftmost one of eight data lines 6a of each group. Accordingly, the a-column data lines 6a correspond to the 1st, 9th, 17th, . . . , and 1977th data lines 6a counted from the right. The b-column data lines 6a correspond to the 2nd, 10th, 18th, . . . , and 1978th data lines 6a counted from the right. The c-column data lines 6a correspond to the 3rd, 11th, 19th, . . . , and 1979th data lines 6a counted from the right. The d-column data lines 6a correspond to the 4th, 12th, 20th, . . . , and 1980th data lines 6a counted from the right. The e-column data lines 6a correspond to the 5th, 13th, 21st, . . . , and 1981st data lines 6a counted from the right. The f-column data lines 6a correspond to the 6th, 14th, 22nd, . . . , and 1982nd data lines 6a counted from the right. The g-column data lines 6a correspond to the 7th, 15th, 23rd, . . . , and 1983rd data lines 6a counted from the right. Finally, the h-column data lines 6a correspond to the 8th, 16th, 24th, . . . , and 1984th data lines 6a counted from the right.

The scanning line driving circuit 104 has a shift register. The scanning-line driving circuit 104 supplies scanning signals G1, G2, G3, . . . , and G1088 to the first, second, third, . . . , and 1088th scanning lines 11a, respectively. More specifically, the scanning line driving circuit 104 selects, in a sequential order, the first, second, third, . . . , 1088th scanning lines 11a during the time period of one frame. The scanning line driving circuit 104 sets the level of a scanning signal that is to be supplied to the selected signal line at a high level H while setting the level of scanning signals that are to be supplied to other non-selected signal lines at a low level L. Herein, the high level of a scanning signal that is to be supplied to the selected signal line corresponds to a selected voltage level, whereas the low level of scanning signals that are to be supplied to other non-selected signal lines corresponds to a non-selected voltage level.

The video signal supply circuit 400, which is provided as an external circuit that is separated from the element substrate 10, is electrically connected to the element substrate 10 via the video signal terminals 102v at the time of the display operation of the liquid crystal device 100. The video signal supply circuit 400 outputs an image signal to the pixel electrode 9a that corresponds to the intersection of the scanning line 11a that is selected by the scanning line driving circuit 104 and one of eight data lines 6a of each group that is selected by the demultiplexer 7. The image signal that is supplied by the image signal supply circuit to each selected pixel electrode 9a has a voltage level that corresponds to the gradation (e.g., gray scale) of the pixel that has the selected pixel electrode 9a. The electric wiring pattern 90 that is shown in FIG. 1 includes a plurality of image signal lines 300. In the following description of this specification, the term "video signal lines" may be used in place of image signal lines. The image signals that are outputted from the image signal supply circuit 400 to the image signal terminals 102v are supplied to the demultiplexer 7 through the image signal lines 300 of the electric wiring pattern 90. In the configuration of the liquid crystal device 100 according to the present embodiment of the invention, preferably, each of the image signal lines 300 has a relatively low resistance line portion 310 and a relatively high resistance line portion 320, the latter of which has a higher resistance than that of the former. Having such a line configuration, each of the image signal lines 300 makes it possible to completely prevent the demultiplexer 7 from being damaged electrostatically, or at least substantially reduce the risk thereof.

At the time of the test operation of the liquid crystal device 100, a test image signal supply circuit is electrically connected to the element substrate 10 via the video signal terminals 102v in place of the non-test image signal supply circuit 400, which is provided as an external circuit that is separated from the element substrate 10. The test image signal supply circuit supplies test image signals thereto for testing the liquid crystal device 100.

As has already been described above, in the configuration of the liquid crystal device 100 according to the present embodiment of the invention, the number of columns of data lines 6a is 1,984, which are divided into 248 groups each of which is made up of eight data lines 6a. Accordingly, the number of the image signal terminals 102v is "248".

The demultiplexer 7 has a plurality of transistors 71 each of which is provided for the corresponding one of the data lines 6a. Each of the transistors 71 is formed as an n-channel transistor. The drain electrode of each of the transistors 71 is electrically connected to one end of the corresponding one of the data lines 6a. The image signal lines 300 are provided so as to correspond to the groups of the data lines 6a. The source electrodes of eight transistors 71 that are electrically connected to, at the drain-electrode side thereof, the corresponding data lines 6a that belong to the same single group are electrically "common-connected" to the corresponding image signal line 300. The same holds true for each of 248 groups thereof.

As will be understood from the foregoing explanation, the m-th (where "m" is any positive integer from 1 inclusive through 248 inclusive) group of the data lines 6a is made up of (8m–7)th data line, (8m–6)th data line, (8m–5)th data line, (8m–4)th data line, (8m–3)th data line, (8m–2)th data line, (8m–1)th data line, and (8m)th data line. Note that these (8m–7)th data line, (8m–6)th data line, (8m–5)th data line, (8m–4)th data line, (8m–3)th data line, (8m–2)th data line, (8m–1)th data line, and (8m)th data line correspond to the aforementioned a-column data line, b-column data line, c-column data line, d-column data line, e-column data line, f-column data line, g-column data line, and h-column data line, respectively. The source electrodes of eight transistors 71 that are connected to, at the drain-electrode side thereof, the corresponding data lines 6a that belong to the same single group are electrically common-connected to the corresponding image signal line 300. An image signal (i.e., video signal) VID (m) is supplied to the m-th group of the data lines 6a. The electric wiring pattern 90 that is shown in FIG. 1 includes a plurality of control signal lines 700. A control signal Sel 1 is supplied through one of the control signal lines 700 to the gate electrode of the transistor 71 of the (8m–7)th data line 6a. A control signal Sel 2 is supplied through one of the control signal lines 700 to the gate electrode of the transistor 71 of the (8m–6)th data line 6a. A control signal Sel 3 is supplied through one of the control signal lines 700 to the gate electrode of the transistor of the (8m–5)th data line 6a. A control signal Sel 4 is supplied through one of the control signal lines 700 to the gate electrode of the transistor 71 of the (8m–4)th data line 6a. A control signal Sel 5 is supplied through one of the control signal lines 700 to the gate electrode of the transistor 71 of the (8m–3)th data line 6a. A control signal Sel 6 is supplied through one of the control signal lines 700 to the gate electrode of the transistor 71 of the (8m–2)th data line 6a. A control signal Sel 7 is supplied through one of the control signal lines 700 to the gate electrode of the transistor 71 of the (8m–1)th data line 6a. A control signal Sel 8 is supplied through one of the control signal lines 700 to the gate electrode of the transistor 71 of the (8m)th data line 6a. Some of the external circuit connection terminals 102 are formed as control signal terminals (e.g., selection signal terminals) 102s over the element substrate 10. A timing control circuit, which is not shown in the drawing, is electrically connected to the plurality of control signal terminals 102s. The timing control circuit is provided as an external circuit that is separated from the element substrate 10. The timing control circuit supplies control signals Sel 1, Sel 2, . . . , and Sel 8 to the control signal lines 700 via the respective control signal terminals 102s. In the configuration of the liquid crystal device 100 according to the present embodiment of the invention, preferably, the control signal line 700 has a structure that is the same as or similar to that of the image signal line 300. That is, each of the control signal lines 700 has a relatively low resistance line portion 710 and a relatively high resistance line portion 720, the latter of which has a higher resistance than that of the former. Having such a line configuration, each of the control signal lines 700 makes it possible to completely prevent the demultiplexer 7 from being damaged electrostatically, or at least substantially reduce the risk thereof.

As shown in FIG. 3, the test circuit 160 has a control circuit 162 and a plurality of TFTs 164 each of which is provided for the corresponding one of the data lines 6a. The TFT 164 is an example of a transistor.

The control circuit 162 has a shift register. A test control circuit, which is not illustrated in the drawing, is provided as an external circuit. The electric wiring pattern 91 that is shown in FIG. 1 includes a plurality of test signal lines 810. At the time of the testing operation of the liquid crystal device 100, a transfer start pulse DX, a clock signal CLX, a reverse (i.e., inverse) clock signal CLXB, a transfer direction control signal DIRX, and a power potential (i.e., voltage) VDDX are supplied to the control circuit 162. These signals are inputted into the control circuit 162 via test terminals 103i of the aforementioned test terminals 103 and through the test signal lines 810 of the electric wiring pattern 91. The transfer start pulse DX described in this specification is a non-limiting example of a "start signal" according to an aspect of the invention. The clock signal CLX (and the reverse clock signal CLXB) described in this specification is a non-limiting example of a "clock signal" according to an aspect of the invention. During the testing operation of the liquid crystal device 100, the control circuit 162 shifts the transfer start pulse DX in accordance with the transfer direction control signal DIRX, the clock signal CLX, and the reverse clock signal CLXB in a sequential manner so as to output transfer pulses X1, X2, . . . , and X248 to the TFTs 164 of the 248 groups of the data lines 6a, respectively. In the configuration of the liquid crystal device 100 according to the present embodiment of the invention, preferably, each of the test signal lines 810 has a relatively low resistance line portion 811 and a relatively high resistance line portion 812, the latter of which has a higher resistance than that of the former. Having such a line configuration, each of the test signal lines 810 makes it possible to completely prevent the test circuit 160 from being damaged electrostatically, or at least substantially reduce the risk thereof. More specifically, each of the test signal lines 810 makes it possible to completely prevent TFTs of the control circuit 162 of the test circuit 160 from being damaged electrostatically, or at least substantially reduce the risk thereof.

Each of the TFTs 164 is formed as an n-channel transistor. The source electrode of each of the TFTs 164 is electrically connected to the other end of the corresponding one of the data lines 6a. That is, the source electrode of each of the TFTs 164 is electrically connected to the other end of the corresponding one of the data lines 6a that is opposite to the aforementioned one end thereof to which the drain electrode of the corresponding transistor 71 of the demultiplexer 7 is electrically connected. The gate electrodes of eight TFTs 164 that are electrically connected to, at the source-electrode side thereof, the corresponding data lines 6a that belong to the same single group are electrically common-connected to the control circuit 162. The same holds true for each of 248 groups thereof. The control circuit 162 supplies a transfer pulse Xm to the m-th group of the data lines 6a.

That is, the control circuit 162 supplies, as a common pulse, a transfer pulse Xm to the gate electrodes of eight TFTs 164 that are electrically connected to, at the source-electrode side thereof, the corresponding data lines 6a that belong to the same single m-th group, which is made up of (8m−7)th data line 6a, (8m−6)th data line 6a, (8m−5)th data line 6a, (8m−4)th data line 6a, (8m−3)th data line 6a, (8m−2)th data line 6a, (8m−1)th data line 6a, and (8m)th data line 6a.

Eight test signal lines 820, the number of which is the same as the number of the data lines 6a that make up each group, are electrically connected to the drain electrodes of the TFTs 164. More specifically, the drain electrode of the TFT 164 that corresponds to the a-column data line 6a in each of 248 groups is electrically connected to one of these eight test signal lines 820. A test output signal that is read out as a signal Cx1 is outputted through the one test signal line 820. That is, the drain electrodes of the a-column TFTs 164 of the 1st, 2nd, 3rd, . . . , 248th groups are electrically common-connected thereto. In like manner, the drain electrodes of the b-column TFTs 164 (i.e., the TFTs 164 that correspond to the b-column data lines 6a) of the 1st, 2nd, 3rd, . . . , 248th groups are electrically common-connected to one of these eight test signal lines 820 through which a test output signal that is read out as a signal Cx2 is outputted. The drain electrodes of the c-column TFTs 164 of the 1st, 2nd, 3rd, . . . , 248th groups are electrically common-connected to one of these eight test signal lines 820 through which a test output signal that is read out as a signal Cx3 is outputted. The drain electrodes of the d-column TFTs 164 of the 1st, 2nd, 3rd, . . . , 248th groups are electrically common-connected to one of these eight test signal lines 820 through which a test output signal that is read out as a signal Cx4 is outputted. The drain electrodes of the e-column TFTs 164 of the 1st, 2nd, 3rd, . . . , 248th groups are electrically common-connected to one of these eight test signal lines 820 through which a test output signal that is read out as a signal Cx5 is outputted. The drain electrodes of the f-column TFTs 164 of the 1st, 2nd, 3rd, . . . , 248th groups are electrically common-connected to one of these eight test signal lines 820 through which a test output signal that is read out as a signal Cx6 is outputted. The drain electrodes of the g-column TFTs 164 of the 1st, 2nd, 3rd, . . . , 248th groups are electrically common-connected to one of these eight test signal lines 820 through which a test output signal that is read out as a signal Cx7 is outputted. The drain electrodes of the h-column TFTs 164 of the 1st, 2nd, 3rd, . . . , 248th groups are electrically common-connected to one of these eight test signal lines 820 through which a test output signal that is read out as a signal Cx8 is outputted. The plurality of test signal lines 820 is included in the electric wiring pattern 91 that is shown in FIG. 1. The test signal lines 820 are electrically connected to the test terminals 103o of the test terminals 103 that are shown in FIG. 1. In the configuration of the liquid crystal device 100 according to the present embodiment of the invention, preferably, the test signal line 820 has a structure that is the same as or similar to that of the test signal line 810. That is, each of the test signal lines 820 has a relatively low resistance line portion 821 and a relatively high resistance line portion 822, the latter of which has a higher resistance than that of the former. Having such a line configuration, each of the test signal lines 820 makes it possible to completely prevent the test circuit 160 from being damaged electrostatically, or at least substantially reduce the risk thereof. More specifically, each of the test signal lines 820 makes it possible to completely prevent the TFTs 164 of the test circuit 160 from being damaged electrostatically, or at least substantially reduce the risk thereof.

During the testing operation of the liquid crystal device 100, the control circuit 162 of the test circuit 160 having the circuit configuration described above outputs the transfer pulses X1, X2, . . . , X248 to the 1st, 2nd, . . . , 248th groups of the data lines 6a respectively so as to put the operation state of the TFTs 164 of the respective groups into an ON state. By this means, the electric potentials (i.e., voltages) of the data lines 6a to which test image signals having a predetermined voltage level have been supplied are outputted to these eight test terminals 103o of the test terminals 103 through these eight test signal lines 820, respectively. A judgment circuit, which is provided as an external circuit, is electrically connected to these eight test terminals 103o. The judgment circuit makes a judgment as to whether the electric potentials of these eight test terminals 103o are at predetermined levels or not. As a result thereof, a decision is made as to whether the demultiplexer 7 and each of the data lines 6a are in a good condition (e.g., OK, in a good operation state, or in good quality, though not limited thereto) or in a bad condition (e.g., NG, in a poor operation state, or in poor quality, though not limited thereto). As will be described in detail later, the above-explained test is conducted with various kinds of element-substrate-side elements/components/lines/patterns/members formed over a single mother substrate. Or, in other words, it is tested whether the demultiplexer 7 and each of the data lines 6a are good or bad before the mother substrate is divided into a plurality of liquid crystal devices 100.

Each of two test terminals 103y of the test terminals 103 (refer to FIG. 1) is provided so as to output, from the corresponding scanning line driving circuit 104, a test output signal that is read out as a signal YEPL or YEPR at the time of the testing operation of the liquid crystal device 100. The electric wiring pattern 91 that is shown in FIG. 1 includes a plurality of test signal lines 830. The test terminal 103y is electrically connected to the scanning line driving circuit 104 through the test signal line 830. More specifically, the test terminal 103y is electrically connected to the output line of the last output stage of the shift register provided in the scanning line driving circuit 104. At the time when the liquid crystal device 100 is tested, the test terminals 103y are probed so as to examine the scanning line driving circuits 104. In the configuration of the liquid crystal device 100 according to the present embodiment of the invention, preferably, each of the test signal lines 830 has a relatively low resistance line portion 831 and a relatively high resistance line portion 832, the latter of which has a higher resistance than that of the former. Having such a line configuration, each of the test signal lines 830 makes it possible to completely prevent the corresponding scanning line driving circuit 104 from being damaged electrostatically, or at least substantially reduce the risk thereof. More specifically, each of these test signal lines 830 makes it possible to completely prevent TFTs of the corresponding scanning line driving circuit 104 from being damaged electrostatically, or at least substantially reduce the risk thereof.

Among the plurality of test terminals 103 that is shown in FIG. 1, a test terminal 103nc is allocated as an unused terminal. Each of the test terminals 103i is electrically connected to the control circuit 162 of the test circuit 160 through the corresponding one of the test signal lines 810, and so is the unused test terminal 103nc.

In the following description, the operation of the liquid crystal device 100 having the configuration described above is explained while referring to FIG. 3.

The scanning line driving circuit 104 sets the level of the scanning signals G1, G2, ..., G1088 at a high level in a sequential and exclusive manner at the lapse of each one horizontal time period throughout a certain frame, which may be hereafter referred to as the "n-th" frame. That is, the scanning line driving circuit 104 sets the level of the scanning signals G1, G2, ..., G1088 at the aforementioned selected voltage level in a sequential manner while not selecting others for each one horizontal time period throughout the n-th frame.

Herein, control signals Sel 1, Sel 2, ..., Sel 8 that are supplied from the aforementioned timing control circuit are sequentially and exclusively set at the H level in the order of appearance herein in each one horizontal time period. In synchronization with the supplying of the control signals Sel 1, Sel 2, ..., Sel 8 from the timing control circuit, the image signal supply circuit 400 supplies image signals VID 1, VID 2, VID 3, ..., and VID 248.

Specifically, during a time period in which the signal level of the scanning signal Gi, which is applied to the i-th row, is set at the H level, the image signal supply circuit 400 outputs image signals VID 1, VID 2, VID 3, and VID 248 to the 1st, 2nd, 3rd, ..., 248th groups of the data lines 6a at the same time, respectively. Each of the image signals VID 1, VID 2, VID 3, ..., and VID 248 is either higher or lower than the electric potential of the counter electrode 21, which is denoted as LCCOM, by the level of a voltage that is in accordance with the gradation (e.g., gray scale) of the pixel that is provided at a position corresponding to the intersection of the i-th scanning line 11a and the a-column data line 6a of each group. Since the control signal Sel 1 only is initially set at the H level, the a-column data line 6a of each group is selected. That is, the a-column transistor 71 only, which corresponds to the a-column data line 6a, turns ON in each group because the control signal Sel 1 only is currently set at the H level. As a result thereof, the image signals VID 1, VID 2, VID 3, ..., and VID 248 that are outputted by the image signal supply circuit 400 are supplied to the a-column data lines 6a of the 1st, 2nd, 3rd, ..., 248th groups, respectively. This means that the image signals VID 1, VID 2, VID 3, ..., and VID 248 that are outputted by the image signal supply circuit 400 are supplied to the 1st, 9th, 17th, ..., and 1977th data lines 6a counted from the right. On the other hand, when the scanning signal Gi is set at the H level, the operation state of each of the pixel-switching TFTs 30 of the corresponding one of the pixels aligned in the i-th row becomes conductive, that is, turns ON. Therefore, the image signals VID 1, VID 2, VID 3, ..., and VID 248 that are outputted by the image signal supply circuit 400 and then supplied to the a-column data lines 6a of the 1st, 2nd, 3rd, ..., 248th groups, respectively, are applied to the 1st, 9th, 17th, ..., and 1977th pixel electrodes 9a counted from the right in the i-th row, respectively.

Next, the control signal Sel 2 is set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the b-column data line 6a of each group. Since the control signal Sel 2 is now set at the H level, the b-column data line 6a of each group is selected. That is, the b-column transistor 71 only, which corresponds to the b-column data line 6a, turns ON in each group because the control signal Sel 2 only is currently set at the H level. As a result thereof, the image signals VID 1, VID 2, VID 3, ..., and VID 248 that are outputted by the image signal supply circuit 400 are supplied to the b-column data lines 6a of the 1st, 2nd, 3rd, ..., 248th groups, respectively. This means that the image signals VID 1, VID 2, VID 3, ..., and VID 248 that are outputted by the image signal supply circuit 400 are supplied to the 2nd, 10th, 18th, ..., and 1978th data lines 6a counted from the right. On the other hand, since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, ..., and VID 248 that are outputted by the image signal supply circuit 400 and then supplied to the b-column data lines 6a of the 1st, 2nd, 3rd, ..., 248th groups, respectively, are applied to the 2nd, 10th, 18th, ..., and 1978th pixel electrodes 9a counted from the right in the i-th row, respectively.

Next, the control signal Sel 3 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the c-column data line 6a of each group. Next, the control signal Sel 4 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the d-column data line 6a of each group. Next, the control signal Sel 5 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the e-column data line 6a of each group. Next, the control signal Sel 6 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the f-column data line 6a of each group. Next, the control signal Sel 7 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the g-column data line 6a of each group. Finally, the control signal Sel 8 is set at the H level while the scanning signal Gi, which is applied to the i-th row, is currently set at the H level. The image signal supply circuit 400 outputs image signals VID 1, VID 2, VID 3, ..., and VID 248 to the 1st, 2nd, 3rd, ..., 248th groups of the data lines 6a at the same time, respectively. Each of the image signals VID 1, VID 2, VID 3, ..., and VID 248 is either higher or lower than the counter-electrode electric potential LCCOM by the level of a voltage that is in accordance with the gradation of the pixel that is provided at a position corresponding to the intersection of the i-th scanning line 11a and the h-column data line 6a of each group. At the time when the control signal Sel 3 is set at the H level, the c-column data line 6a of each group is selected. That is, the c-column transistor 71 only, which corresponds to the c-column data line 6a, turns ON in each group because the control signal Sel 3 only is currently set at the H level. As a result thereof, the image signals VID 1, VID 2, VID 3, ..., and VID 248 that are outputted by the image signal supply circuit 400 are supplied to the c-column data lines 6a of the 1st, 2nd, 3rd, ..., 248th groups, respectively. This means that the image signals VID 1, VID 2, VID 3, ..., and VID 248 that are outputted by the image signal supply circuit 400 are supplied to the 3rd, 11th, 19th, ..., and 1979th data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, ..., and VID 248 that are outputted by the image signal supply circuit 400 and then supplied to the c-column data lines 6a of the 1st, 2nd, 3rd, ..., 248th groups, respectively, are applied to the 3rd, 11th, 19th, ..., and 1979th pixel electrodes 9a counted from the right in the i-th row, respectively. At the time when the control signal Sel 4 is set at the H level, the d-column data line 6a of each group is selected. That is, the d-column transistor 71 only, which corresponds to the d-column data line 6a, turns ON in each group because the control signal Sel 4 only is currently set at the H level. As a result thereof, the image signals VID 1, VID 2, VID 3, and VID 248 that are outputted by the image signal supply circuit 400 are supplied to the d-column data lines 6a of the 1st, 2nd, 3rd, ..., 248th groups, respectively. This means that the image signals VID 1, VID 2, VID 3, ..., and VID 248 that are outputted by the image signal supply circuit 400 are supplied to the 4th, 12th, 20th, ..., and 1980th data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, ..., and VID 248 that are outputted by the image signal supply circuit 400 and then supplied to the d-column data lines 6a of the 1st, 2nd, 3rd, ..., 248th groups, respectively, are applied to the 4th, 12th, 20th, ..., and 1980th pixel electrodes 9a counted from the right in the i-th row, respectively. At the time when the control signal Sel 5 is set at the H level, the e-column data line 6a of each group is selected. That is, the e-column transistor 71 only, which corresponds to the e-column data line 6a, turns ON in each group because the control signal Sel 5 only is currently set at the H level. As a result thereof, the image signals VID 1, VID 2, VID 3, ..., and VID 248 that are outputted by the image signal supply circuit 400 are supplied to the e-column data lines 6a of the 1st, 2nd, 3rd, ..., 248th groups, respectively. This means that the image signals VID 1, VID 2, VID 3, ..., and VID 248 that are outputted by the image signal supply circuit 400 are supplied to the 5th, 13th, 21st, ..., and 1981st data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, ..., and VID 248 that are outputted by the image signal supply circuit 400 and then supplied to the e-column data lines 6a of the 1st, 2nd, 3rd, ..., 248th groups, respectively, are applied to the 5th, 13th, 21st, ..., and 1981st pixel electrodes 9a counted from the right in the i-th row, respectively. At the time when the control signal Sel 6 is set at the H level, the f-column data line 6a of each group is selected. That is, the f-column transistor 71 only, which corresponds to the f-column data line 6a, turns ON in each group because the control signal Sel 6 only is currently set at the H level. As a result thereof, the image signals VID 1, VID 2, VID 3, and VID 248 that are outputted by the image signal supply circuit 400 are supplied to the f-column data lines 6*a* of the 1st, 2nd, 3rd, . . . , 248th groups, respectively. This means that the image signals VID 1, VID 2, VID 3, . . . , and VID 248 that are outputted by the image signal supply circuit 400 are supplied to the 6th, 14th, 22nd, . . . , and 1982nd data lines 6*a* counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the f-column data lines 6*a* of the 1st, 2nd, 3rd, . . . , 248th groups, respectively, are applied to the 6th, 14th, 22nd, . . . , and 1982nd pixel electrodes 9*a* counted from the right in the i-th row, respectively. At the time when the control signal Sel 7 is set at the H level, the g-column data line 6*a* of each group is selected. That is, the g-column transistor 71 only, which corresponds to the g-column data line 6*a*, turns ON in each group because the control signal Sel 7 only is currently set at the H level. As a result thereof, the image signals VID 1, VID 2, VID 3, . . . , and VID 248 that are outputted by the image signal supply circuit 400 are supplied to the g-column data lines 6*a* of the 1st, 2nd, 3rd, . . . , 248th groups, respectively. This means that the image signals VID 1, VID 2, VID 3, . . . , and VID 248 that are outputted by the image signal supply circuit 400 are supplied to the 7th, 15th, 23rd, . . . , and 1983rd data lines 6*a* counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the g-column data lines 6*a* of the 1st, 2nd, 3rd, . . . , 248th groups, respectively, are applied to the 7th, 15th, 23rd, . . . , and 1983rd pixel electrodes 9*a* counted from the right in the i-th row, respectively. Finally, at the time when the control signal Sel 8 is set at the H level, the h-column data line 6*a* of each group is selected. That is, the h-column transistor 71 only, which corresponds to the h-column data line 6*a*, turns ON in each group because the control signal Sel 8 only is currently set at the H level. As a result thereof, the image signals VID 1, VID 2, VID 3, . . . , and VID 248 that are outputted by the image signal supply circuit 400 are supplied to the h-column data lines 6*a* of the 1st, 2nd, 3rd, . . . , 248th groups, respectively. This means that the image signals VID 1, VID 2, VID 3, . . . , and VID 248 that are outputted by the image signal supply circuit 400 are supplied to the 8th, 16th, 24th, . . . , and 1984th data lines 6*a* counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the h-column data lines 6*a* of the 1st, 2nd, 3rd, . . . , 248th groups, respectively, are applied to the 8th, 16th, 24th, . . . , and 1984th pixel electrodes 9*a* counted from the right in the i-th row, respectively.

In this way, the operation of writing the gradation-dependent voltages of image signals is completed for all pixels that are arrayed in the i-th row. It should be noted that voltages applied to the pixel electrodes 9*a* are kept by the aforementioned liquid crystal capacitors until the next (n+1) frame even after the level of the scanning signal Gi has turned to low (L).

Figure 5:
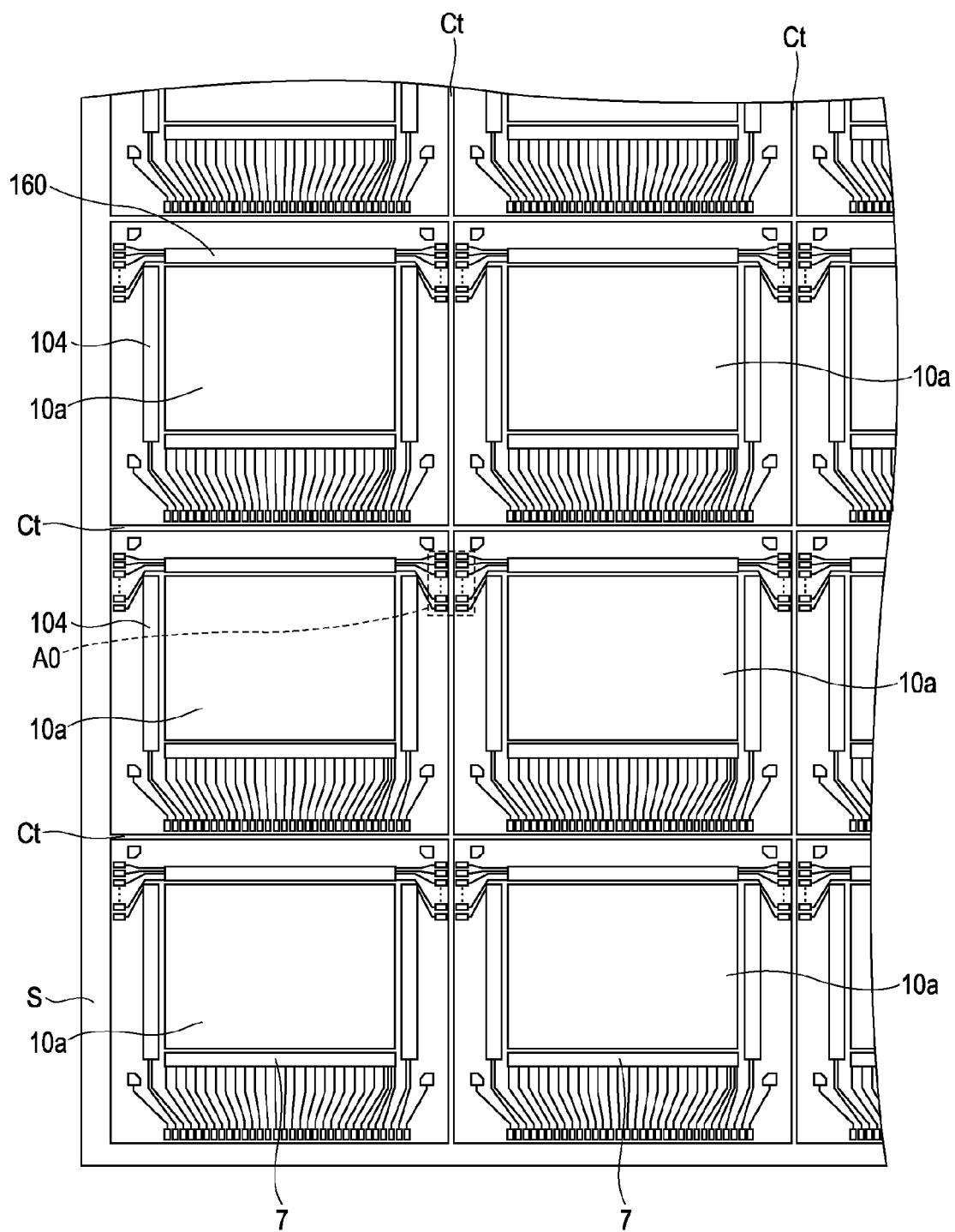
FIG. 5 is a partial plan view that schematically illustrates an example of the configuration of uncut liquid crystal devices according to the present embodiment of the invention, which are formed on a single mother substrate as half-finished products in the production process thereof.
Figure 6:
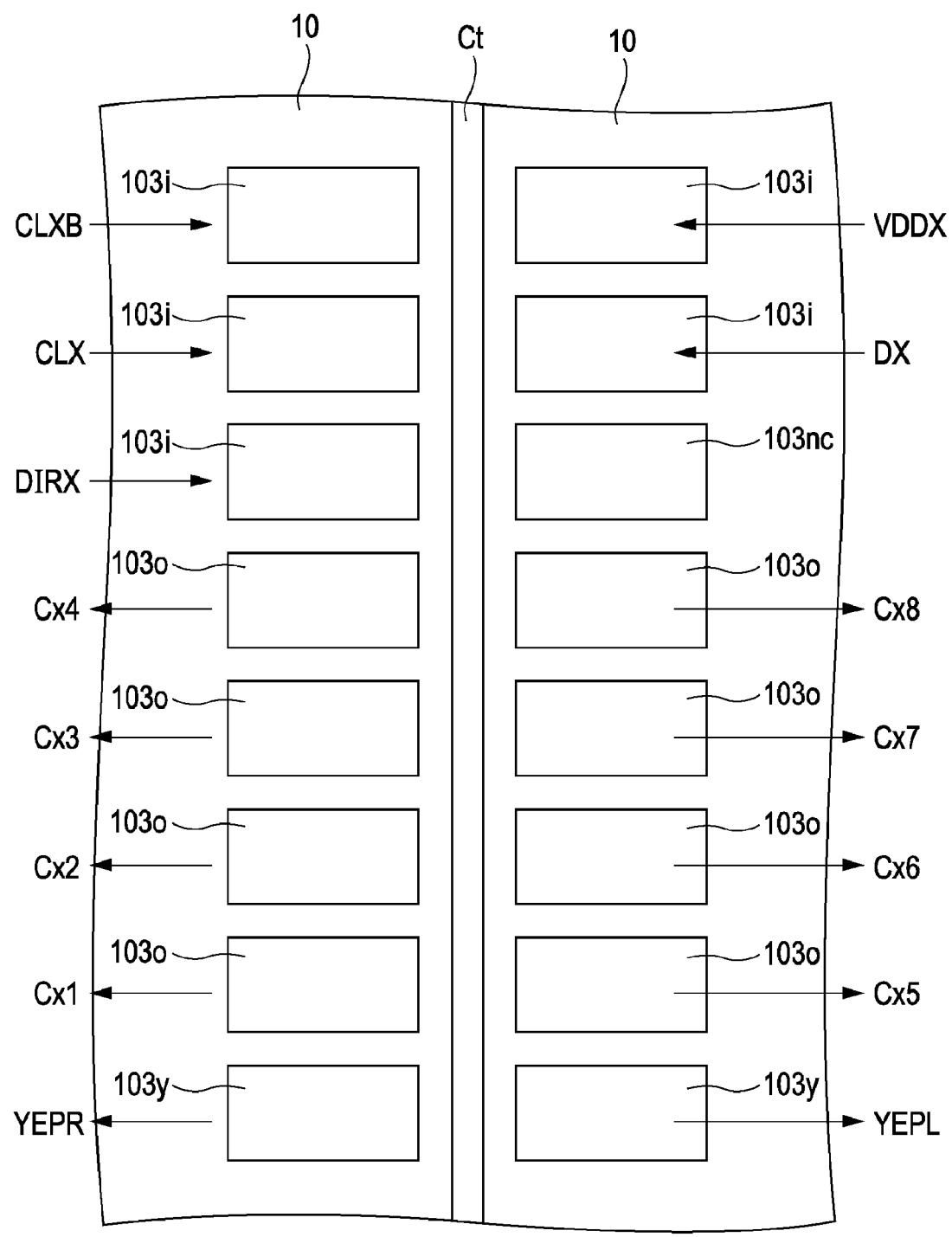
FIG. 6 is a partially enlarged plan view that schematically illustrates an example of a part of the configuration of half-finished (i.e., undivided) liquid crystal devices shown in FIG. 6; or, more specifically.

Next, with reference to FIGS. 5 and 6, the layout positions of the test terminals 103 of the liquid crystal device 100 according to the present embodiment of the invention are explained below. FIG. 5 is a partial plan view that schematically illustrates an example of the configuration of uncut liquid crystal devices according to the present embodiment of the invention, which are formed on a single mother substrate as half-finished products in the production process thereof. FIG. 6 is a partially enlarged plan view that schematically illustrates an example of a part of the configuration of half-finished (i.e., undivided) liquid crystal devices shown in FIG. 5; or, more specifically, FIG. 6 illustrates, in a partial close-up plan view, a test terminal area shown as a dotted box A0 in FIG. 5.

As shown in FIG. 5, a plurality of liquid crystal devices 100 according to the present embodiment of the invention is formed on a single mother substrate S in the manufacturing process thereof. The single mother substrate S described in this specification is a non-limiting example of a "large-size substrate" according to an aspect of the invention. The plurality of liquid crystal devices 100 is formed in a matrix array layout made up of a plurality of rows and a plurality of columns over the single mother substrate S. Various kinds of element-substrate-side elements/components/lines/patterns/members including but not limited to the plurality of pixel-switching TFTs 30, the plurality of scanning lines 11*a*, the plurality of data lines 6*a*, the scanning line driving circuit(s) 104, the demultiplexer 7, and the test circuit 160, which have already been described earlier while referring to FIGS. 1, 2, 3, and 4, are formed in each of the plurality of liquid crystal devices 100 arrayed in a matrix over the single mother substrate S.

The single mother substrate S shown in FIG. 5 has a plurality of element substrates 10 shown in FIGS. 1 and 2. Various kinds of element-substrate-side elements/components/lines/patterns/members as those enumerated above without any limitation thereto are formed over the single mother substrate S shown in FIG. 5. On the other hand, the counter electrode 21 and the aforementioned orientation film, though not limited thereto, are formed over a quartz substrate or a glass substrate that is not shown in FIG. 5. A plurality of counter substrates 20 is formed over the quartz substrate or the glass substrate that is not shown in FIG. 5. Then, the plurality of counter substrates 20 that is formed over the quartz substrate or the glass substrate is divided into a plurality of individual counter substrates 20. For example, the counter substrates 20 that are formed over the quartz substrate or the glass substrate are scribed and then broken into the plurality of individual counter substrates 20. Each of the plurality of divided counter substrates 20 is arrayed opposite to the corresponding one of the plurality of element substrates 10 formed over the single mother substrate S, thereby making a plurality of pairs thereof. Next, each of the plurality of divided counter substrates 20 and the corresponding one of the plurality of element substrates 10 formed over the single mother substrate S are bonded to each other on a one-to-one basis by means of the aforementioned sealant material 52. Subsequently, liquid crystal is injected into a space between each pair of the element substrate 10 and the counter substrate 20 in such a manner that it is sealed therebetween. Thereafter, the single mother substrate S is divided into a plurality of substrate pieces. In this way, the liquid crystal device 100 according to the present embodiment of the invention, a non-limiting example of which is shown in FIGS. 1 and 2, is manufactured.

As illustrated in FIGS. 5 and 6, a cut region Ct is formed around the contour of, that is, at the periphery of, each of the plurality of element substrates 10 formed in a matrix array over the single mother substrate S. The single mother substrate S is divided into a plurality of substrate pieces as a result of dicing or scribing the cut area Ct thereof.

The plurality of test terminals 103 shown in the enlarged view of FIG. 6, which is made up of the test terminals 103i, 103o, 103nc, and 103y, are arrayed along each of the vertical sides outside the sealing region 52a in the peripheral region over the element substrate 10. As has already been explained earlier while referring to FIG. 1, the plurality of test terminals 103 is arrayed in a line at each vertical peripheral region to the left/right of the image display area 10a over the element substrate 10, which is a non-limiting layout example. Therefore, the test terminals 103 that are formed at one vertical side region of one element substrate 10 and the test terminals 103 that are formed at one (which is adjacent to the one vertical side region) vertical side region of another element substrate 10 that is formed adjacent to the one element substrate 10 are arrayed adjacent to each other with the cut region Ct being interposed therebetween.

For example, as illustrated in FIG. 6 and as will be understood from FIG. 5, eight test terminals 103 that are formed at the right side region of the left element substrate 10 and eight test terminals 103 that are formed at the left side region of the right element substrate 10 that is formed adjacent to the left element substrate 10 are arrayed adjacent to each other with the cut region Ct being interposed therebetween.

In the layout of the plurality of test terminals 103 according to the present embodiment of the invention, as illustrated in FIGS. 3 and 6, the test terminals 103o that constitute a part of the test terminals 103 are arrayed over the element substrate 10 in such a manner that each of the test terminals 103o from which a test output signal is outputted as has already been explained earlier is not adjacent to the clock signal input test terminal 103i through which the clock signal CLX is inputted into the control circuit 162, the reverse clock signal input test terminal 103i through which the reverse clock signal CLXB is inputted into the control circuit 162, and the transfer start pulse input test terminal 103i through which the transfer start pulse DX is inputted into the control circuit 162. Note that each of the clock signal CLX, the reverse clock signal CLXB, and the transfer start pulse DX is a signal having a predetermined frequency.

Herein, for the purpose of explanation, our attention is drawn to eight test terminals 103 that are formed at the right area of the left one of two arbitrary-selected element substrates 10 formed adjacent to each other on the mother substrate S as shown in FIG. 6. These eight test terminals 103 are provided along one of the second-mentioned two sides of the element substrate 10 as has already been described above while referring to FIGS. 1 and 3. As also explained above, the electric potential of the a-column data line 6a of each group, the electric potential of the b-column data line 6a of each group, the electric potential of the c-column data line 6a of each group, and the electric potential of the d-column data line 6a of each group are outputted at the time of testing operation from four test terminals 103o of the eight test terminals 103 that are provided along the one of the second-mentioned two sides of the element substrate 10 as the aforementioned test output signals Cx1, Cx2, Cx3, and Cx4, respectively, through the aforementioned test signal line 820. In the layout of these eight test terminals 103 according to the present embodiment of the invention, these four test terminals 103o that constitute a part of these eight test terminals 103 are arrayed over the element substrate 10 in such a manner that each of these four test terminals 103o from which the test output signal Cx1, Cx2, Cx3, or Cx4 is outputted is not adjacent to the clock signal input test terminal 103i through which the clock signal CLX is inputted into the control circuit 162 nor adjacent to the reverse clock signal input test terminal 103i through which the reverse clock signal CLXB is inputted into the control circuit 162. Likewise, the test terminal 103y through which the test output signal YEPR that has been outputted from the scanning line driving circuit 104 goes out is not adjacent to the clock signal input test terminal 103i through which the clock signal CLX is inputted into the control circuit 162 nor adjacent to the reverse clock signal input test terminal 103i through which the reverse clock signal CLXB is inputted into the control circuit 162. Simply said, none of these four test terminals 103o corresponding to the test output signals Cx1, Cx2, Cx3, and Cx4 as well as the test terminal 103y corresponding to the test output signal YEPR is provided next to the clock signal input test terminal 103i corresponding to the clock signal CLX and the reverse clock signal input test terminal 103i corresponding to the reverse clock signal CLXB.

That is, it is possible to array these five right-area test terminals made up of the four test terminals 103o from which the test output signals Cx1, Cx2, Cx3, and Cx4 are outputted and the test terminal 103y from which the test output signal YEPR is outputted at positions distanced from the clock signal input test terminal 103i to which the clock signal input CLX is supplied and the reverse clock signal input test terminal 103i to which the reverse clock signal input CLXB is supplied.

Each of the clock signal CLX and the reverse clock signal CLXB determines the driving frequency of the control circuit 162 of the test circuit 160. Each of the clock signal CLX and the reverse clock signal CLXB is inputted into the corresponding test terminal 103i as a signal having a relatively high frequency, which fluctuates between an H level and an L level periodically. Therefore, if any of the four test terminals 103o from which the test output signals Cx1, Cx2, Cx3, and Cx4 are outputted and the test terminal 103y from which the test output signal YEPR is outputted is provided next to the clock signal input test terminal 103i to which the clock signal input CLX is supplied and/or the reverse clock signal input test terminal 103i to which the reverse clock signal input CLXB is supplied, a detected test output signal tends to be more susceptible to noise than otherwise. Specifically, such a layout has a greater risk of noise contamination in which the waveform of the high frequency clock signal CLX or the high frequency reverse clock signal CLXB appears as a noise component in a test output signal that is detected by means of a test probe at the high-frequency-adjacent test terminal 103o and/or 103y. Such noise contamination occurs as a result of, for example, electric or electro-magnetic interference or the like between terminals or test probes.

As explained above, in the layout of the plurality of test terminals 103 according to the present embodiment of the invention, the five right-area test terminals made up of the four test terminals 103o from which the test output signals Cx1, Cx2, Cx3, and Cx4 are outputted and the test terminal 103y from which the test output signal YEPR is outputted are arrayed at positions distanced from the clock signal input test terminal 103i to which the clock signal input CLX is supplied and the reverse clock signal input test terminal 103i to which the reverse clock signal input CLXB is supplied. By this means, it is possible to prevent any test probe that is used for detecting the test output signal Cx1, Cx2, Cx3, Cx4, or YEPR from being provided close to, or in contact with, the test probe that is used for inputting the clock signal CLX or the test probe that is used for inputting the reverse clock signal CLXB.

Specifically, the transfer direction control signal input test terminal 103*i* through which the transfer direction control signal DIRX is inputted into the control circuit 162 is provided between the five right-area test terminals, which are made up of the four test terminals 103*o* from which the test output signals Cx1, Cx2, Cx3, and Cx4 are outputted and the test terminal 103*y* from which the test output signal YEPR is outputted, and the clock signal input test terminal 103*i* to which the clock signal input CLX is supplied and the reverse clock signal input test terminal 103*i* to which the reverse clock signal input CLXB is supplied. Since the transfer direction control signal input test terminal 103*i* is formed between the five test terminals 103*o*/103*y* and the clock signal input test terminal 103*i*/reverse clock signal input test terminal 103*i*, it is possible to make the transfer direction control signal input test terminal 103*i*, which the transfer direction control signal input DIRX is supplied to, function as a shield against electric or electro-magnetic interference that would otherwise occur therebetween.

Thus, if the layout of the test terminals 103 explained above is adopted, it is possible to prevent the waveform of the clock signal CLX or the reverse clock signal CLXB from being contained as a noise in any of the detected test output signals Cx1, Cx2, Cx3, Cx4, and YEPR with enhanced reliability.

Next, our attention is drawn to eight test terminals 103 that are formed at the left area of the right one of two arbitrary-selected element substrates 10 formed adjacent to each other on the mother substrate S as shown in FIG. 6. These eight test terminals 103 are provided along the other of the second-mentioned two sides of the element substrate 10 as has already been described above while referring to FIGS. 1 and 3. As also explained above, the electric potential of the e-column data line 6*a* of each group, the electric potential of the f-column data line 6*a* of each group, the electric potential of the g-column data line 6*a* of each group, and the electric potential of the h-column data line 6*a* of each group are outputted at the time of testing operation from four test terminals 103*o* of the eight test terminals 103 that are provided along the other of the second-mentioned two sides of the element substrate 10 as the aforementioned test output signals Cx5, Cx6, Cx7, and Cx8, respectively, through the aforementioned test signal line 820. In the layout of these eight test terminals 103 according to the present embodiment of the invention, these four test terminals 103*o* that constitute a part of these eight test terminals 103 are arrayed over the element substrate 10 in such a manner that each of these four test terminals 103*o* from which the test output signal Cx5, Cx6, Cx7, or Cx8 is outputted is not adjacent to the transfer start pulse input test terminal 103*i* through which the transfer start pulse DX is inputted into the control circuit 162. Likewise, the test terminal 103*y* through which the test output signal YEPL that has been outputted from the scanning line driving circuit 104 goes out is not adjacent to the transfer start pulse input test terminal 103*i* through which the transfer start pulse DX is inputted into the control circuit 162.

The unused test terminal 103*nc* is provided between the five left-area test terminals, which are made up of the four test terminals 103*o* from which the test output signals Cx5, Cx6, Cx7, and Cx8 are outputted and the test terminal 103*y* from which the test output signal YEPL is outputted, and the transfer start pulse input test terminal 103*i* to which the transfer start pulse input DX is supplied.

Herein, the control circuit 162 of the test circuit 160 shown in FIG. 3 performs the transferring of the transfer start pulse DX in synchronization with the supply of an image signal for testing to the video signal terminal 102*v*, which is provided at the opposite side when viewed from the control circuit 162 with the image display area 10*a* being provided therebetween. The transfer start pulse DX is a signal whose electric potential changes periodically (i.e., for each one horizontal time period) from the L level to the H level. The transfer start pulse DX is inputted as a signal having a frequency that is lower than that of each of the clock signal CLX and the reverse clock signal CLXB.

Therefore, the same advantageous effects as those produced by the aforementioned five test terminals 103*o* and 103*y* that are provided along the one of the second-mentioned two sides of the element substrate 10 are produced. That is, in the layout of the plurality of test terminals 103 according to the present embodiment of the invention, the five left-area test terminals made up of the four test terminals 103*o* from which the test output signals Cx5, Cx6, Cx7, and Cx8 are outputted and the test terminal 103*y* from which the test output signal YEPL is outputted are arrayed at positions distanced from the transfer start pulse input test terminal 103*i* to which the transfer start pulse input DX is supplied. By this means, it is possible to prevent any test probe that is used for detecting the test output signal Cx5, Cx6, Cx7, Cx8, or YEPL from being provided close to, or in contact with, the test probe that is used for inputting the transfer start pulse DX.

Since the unused test terminal 103*nc* is formed between the five test terminals 103*o*/103*y* and the transfer start pulse input test terminal 103*i*, it is possible to make the unused test terminal 103*nc* function as a shield against electric or electro-magnetic interference that would otherwise occur therebetween. In the foregoing description of the present embodiment of the invention, it is explained that the unused test terminal 103*nc* is formed between the five test terminals 103*o*/103*y* and the transfer start pulse input test terminal 103*i*. However, the scope of this aspect of the invention is not limited to such an exemplary layout configuration. For example, the power potential input test terminal 103*i* to which the power potential input VDDX is supplied as shown in FIG. 3 or FIG. 6 may be formed between the five test terminals 103*o*/103*y* and the transfer start pulse input test terminal 103*i* in place of the unused test terminal 103*nc*. Such a modified layout produces the same advantageous effects as those produced by the aforementioned layout configuration in which the unused test terminal 103*nc* is formed between the five test terminals 103*o*/103*y* and the transfer start pulse input test terminal 103*i*.

Thus, if the layout of the test terminals 103 explained above is adopted, it is possible to prevent the waveform of the transfer start pulse DX from being contained as a noise in any of the detected test output signals Cx5, Cx6, Cx7, Cx8, and YEPL with enhanced reliability.

As further illustrated in FIG. 6, on the one hand, none of the five test terminals that are formed at the right area of the left one of the two arbitrary-selected element substrates 10 formed adjacent to each other on the uncut mother substrate S, that is, the four test terminals 103*o* corresponding to the test output signals Cx1, Cx2, Cx3, and Cx4 as well as the test terminal 103*y* corresponding to the test output signal YEPR, is provided next to the transfer start pulse input test terminal 103*i* through which the transfer start pulse DX is inputted into the control circuit 162, which is formed on the right one of the two arbitrary-selected element substrates 10 formed adjacent to each other on the uncut mother substrate S, before dicing or scribing.

On the other hand, none of the five test terminals that are formed at the left area of the right one of the two arbitrary-selected element substrates 10 formed adjacent to each other on the uncut mother substrate S, that is, the four test terminals 103*o* corresponding to the test output signals Cx5, Cx6, Cx7, and Cx8 as well as the test terminal 103y corresponding to the test output signal YEPL, is provided next to the clock signal input test terminal 103i to which the clock signal input CLX is supplied and the reverse clock signal input test terminal 103i to which the reverse clock signal input CLXB is supplied, each of which is formed on the left one of the two arbitrary-selected element substrates 10 formed adjacent to each other on the uncut mother substrate S, before dicing or scribing.

Thus, if the layout of the test terminals 103 according to the present embodiment of the invention is adopted, it is possible to prevent the waveform of the transfer start pulse DX inputted to the transfer start pulse input test terminal 103i, which is formed on the right one of the two arbitrary-selected element substrates 10 formed adjacent to each other on the uncut mother substrate S, from being contained as a noise in any of the detected test output signals Cx1, Cx2, Cx3, Cx4, and YEPR, which are respectively outputted from the five test terminals 103o and 103y each of which is formed at the right area of the left one of the two arbitrary-selected element substrates 10 formed adjacent to each other on the uncut mother substrate S. The same noise prevention is also achieved for the right-hand test outputs. That is, if the layout of the test terminals 103 according to the present embodiment of the invention is adopted, it is possible to prevent the waveform of the clock signal CLX inputted to the clock signal input test terminal 103i and the waveform of the reverse clock signal CLXB inputted to the reverse clock signal input test terminal 103i, each of which is formed on the left one of the two arbitrary-selected element substrates 10 formed adjacent to each other on the uncut mother substrate S, from being contained as a noise in any of the detected test output signals Cx5, Cx6, Cx7, Cx8, and YEPL, which are respectively outputted from the five test terminals 103o and 103y each of which is formed at the left area of the right one of the two arbitrary-selected element substrates 10 formed adjacent to each other on the uncut mother substrate S.

As explained in detail above, the liquid crystal device 100 according to the present embodiment of the invention makes it possible to conduct a substantially error-free inspection on the basis of the noise-free test output signals Cx1-Cx8 as well as YEPR and YEPL even when the array pitch of the plurality of the test terminals 103 is small, that is, even with a narrow terminal-to-terminal pitch, which is required for making the size of the liquid crystal device smaller. Thus, the liquid crystal device 100 according to the present embodiment of the invention is capable of displaying an image in high quality with enhanced reliability. Moreover, the liquid crystal device 100 according to the present embodiment of the invention makes it possible to achieve a smaller size in an easy manner.

In the foregoing description of the layout of the plurality of test terminals 103 according to the present embodiment of the invention, it is explained that the test terminals 103o and 103y that constitute a part of the test terminals 103 are arrayed over the element substrate 10 in such a manner that each of the test terminals 103o and 103y from which a test output signal is outputted is not adjacent to the clock signal input test terminal 103i through which the clock signal CLX is inputted into the control circuit 162, the reverse clock signal input test terminal 103i through which the reverse clock signal CLXB is inputted into the control circuit 162, and the transfer start pulse input test terminal 103i through which the transfer start pulse DX is inputted into the control circuit 162. It is further explained in the foregoing description that each of the clock signal CLX, the reverse clock signal CLXB, and the transfer start pulse DX is a signal having a predetermined frequency. However, the scope of this aspect of the invention is not limited to such an exemplary layout. For example, in a case where the signal that has a predetermined frequency is not inputted but outputted as a test signal, other test output terminals (103o and 103y, though not limited thereto) from each of which a test output signal is outputted may be arrayed in such a manner that each of these other test output terminals is not adjacent to the test terminal from which the signal that has a predetermined frequency is outputted, which is similar to the foregoing non-adjacent layout of the present embodiment of the invention. Even with such a modification, it is possible to conduct a substantially error-free inspection on the basis of noise-free test output signals as explained in the foregoing description of the present embodiment of the invention.

Figure 7:
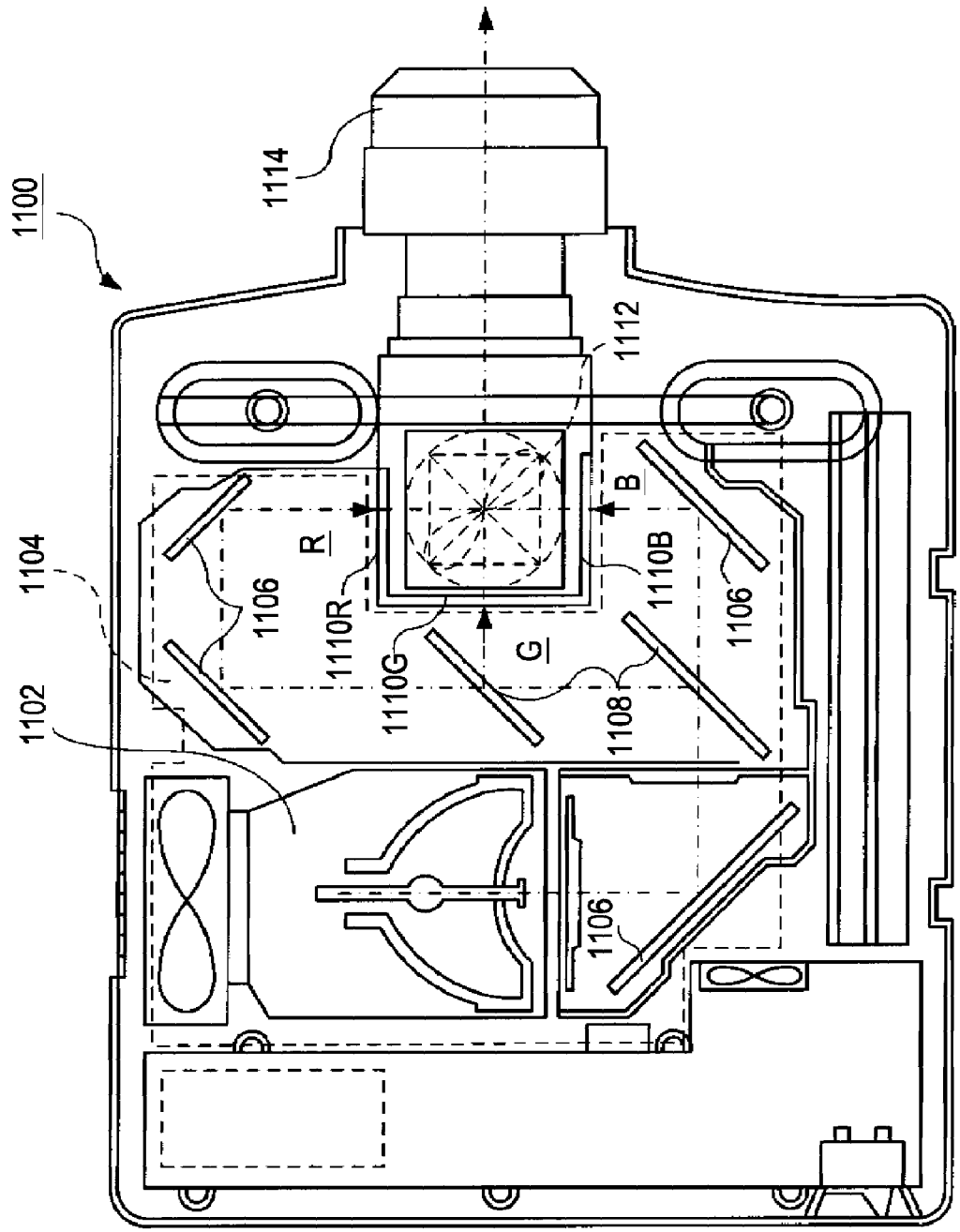
FIG. 7 is a plan view that schematically illustrates an example of the configuration of a projector, which is an example of electronic apparatuses to which an electro-optical device according to an aspect of the invention is applied.

Next, an explanation is given of an example of the applications of a liquid crystal device described above, which is a non-limiting example of an electro-optical device according to an aspect of the invention, to various kinds of electronic apparatuses. Herein, an explanation is given of a projector that employs the above-described liquid crystal device as a light valve. FIG. 7 is a plan view that schematically illustrates an example of the configuration of a projector.

As illustrated in FIG. 7, a lamp unit 1102, which is made of a white light source such as a halogen lamp, is provided in a projector 1100. A projection light beam that is emitted from the lamp unit 1102 is separated into three primary color components of R, G, and B by four mirrors 1106 and two dichroic mirrors 1108 arranged in a light guide 1104. The separated primary color components of R, G, and B enter liquid crystal panel 1110R, 1110G, and 1110B, respectively, which function as light valves corresponding to the respective primary color components.

The configuration of the liquid crystal panel 1110R, 1110G, or 1110B is the same as or similar to that of the liquid crystal device described above. Each of these liquid crystal panels 1110R, 1110G, and 1110B is driven by the corresponding one of the primary color signals R, G, and B, which are supplied from an image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Focusing attention on a display image offered by each of the liquid crystal panels 1110R, 1110G, and 1110B, it is necessary to reverse the display image of the liquid crystal panel 1110G in a mirror pattern (that is, to reverse the left side and the right side) with respect to the display images of the liquid crystal panels 1110R and 1110B.

Because light corresponding to each one of the primary colors R, G, and B goes in the corresponding one of the liquid crystal panel 1110R, 1110G, and 1110B thanks to the presence of the dichroic mirror 1108, it is not necessary to provide a color filter thereon.

Among a variety of electronic apparatuses to which the electro-optical device according to an aspect the invention could be embodied are, in addition to the electronic apparatus (projector) explained above with reference to FIG. 7, a mobile-type personal computer, a mobile phone, a liquid crystal display television, a viewfinder-type video recorder, a video recorder of a direct monitor view type, a car navigation device, a pager, an electronic personal organizer, an electronic calculator, a word processor, a workstation, a videophone, a POS terminal, a touch-panel device, and so forth.

Needless to say, the invention is also applicable to these various electronic apparatuses without any limitation to those enumerated/mentioned above.

In addition to the liquid crystal device explained in the exemplary embodiments described above, the invention is also applicable to a reflective liquid crystal display which has elements formed on a silicon substrate (LCOS, liquid crystal on silicon), a plasma display (PDP), a field emission display (FED), a surface-conduction electron-emitter display (SED), an organic EL display, a digital micro mirror device (DMD), an electrophoresis apparatus, to name but a few.

The present invention should be in no case interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as recitation of appended claims. An electro-optical device subjected to such modification, alteration, change, adaptation, and/or improvement and an electronic apparatus that is provided with such an electro-optical device are also within the technical scope of the invention.

What is claimed is:

1. An electro-optical device comprising:
a substrate;
a plurality of pixel units arrayed over the substrate;
a test circuit provided over the substrate and being for testing drive of the plurality of pixel units; and
a plurality of test terminals that output inputted signals to the test circuit or that output signals inputted from the test circuit, the test terminals including a first test terminal, a second test terminal, and a third test terminal, the first test terminal being input with a high frequency signal with a frequency higher than a frequency of a signal output from the second terminal, the third test terminal being interposed between the first test terminal and the second test terminal.

2. The electro-optical device according to claim 1, wherein the test terminals is arrayed in such a manner that the second test terminals is not adjacent to the first test terminal thereof through which a clock signal is inputted.

3. The electro-optical device according to claim 2, wherein the test circuit sequentially transfers a start signal; and the test terminals is arrayed in such a manner that the second test terminals is not adjacent to the first test terminal thereof through which the start signal is inputted.

4. The electro-optical device according to claim 1 that is manufactured from a large-size substrate that includes a plurality of the substrates by cutting the large-size substrate into a plurality of the substrates, wherein the test terminals is arrayed over each substrate in such a manner that each of a certain area side of the second test terminal formed on one of two arbitrary-selected substrates, which is formed adjacent to each other on the uncut large-size substrate, is not adjacent to the first test terminal at the opposite area side of the other of the two arbitrary-selected substrates.

5. An electronic apparatus that is provided with the electro-optical device according to claim 1.

* * * * *